United States Patent [19]

Suzuki

[11] Patent Number: 5,299,316
[45] Date of Patent: Mar. 29, 1994

[54] METHOD OF AUTOMATICALLY EDITING DATA FOR MANAGING PROCESSOR THAT CARRIES OUT DISTRIBUTED CONTROL AND A SYSTEM USING THE SAME

[75] Inventor: Masayoshi Suzuki, Kawasaki, Japan

[73] Assignee: Fujitsu Limited, Kawasaki, Japan

[21] Appl. No.: 465,169

[22] PCT Filed: Jun. 30, 1989

[86] PCT No.: PCT/JP89/00656

§ 371 Date: Feb. 28, 1990

§ 102(e) Date: Feb. 28, 1990

[87] PCT Pub. No.: WO90/00339

PCT Pub. Date: Nov. 1, 1990

[30] Foreign Application Priority Data

Jun. 30, 1988 [JP] Japan .................................. 63-163024

[51] Int. Cl.$^5$ .............................................. G06F 13/14
[52] U.S. Cl. ..................................... 395/325; 395/800;
379/201; 364/DIG. 1; 364/240.8; 364/240.9;
364/222.2; 364/222.3
[58] Field of Search ...................... 340/825.06; 379/90,
379/219, 422, 423, 220, 224, 225, 227, 229, 242,
245, 246, 201; 395/325, 725, 800, 200

[56] References Cited

U.S. PATENT DOCUMENTS

| | | | |
|---|---|---|---|
| 3,641,505 | 2/1972 | Artz et al. | 395/325 |
| 4,195,344 | 3/1980 | Yamazaki | 395/325 |
| 4,617,642 | 10/1986 | Clark | 340/825.89 X |
| 4,644,532 | 2/1987 | George et al. | 370/94.3 |
| 4,718,002 | 1/1988 | Carr | 395/200 |
| 4,827,411 | 5/1989 | Arrowood et al. | 395/600 |
| 4,933,967 | 6/1990 | Lo et al. | 379/207 |
| 5,049,873 | 9/1991 | Robins et al. | 340/825.06 |
| 5,060,140 | 10/1991 | Brown et al. | 395/325 |
| 5,101,348 | 3/1992 | Arrowood et al. | 395/200 |
| 5,121,486 | 6/1992 | Kurihara et al. | 395/325 |

FOREIGN PATENT DOCUMENTS 0217555 3/1986 European Pat. Off. .
PCT/EP87/-
00522 9/1987 European Pat. Off. .
2202062A 3/1987 United Kingdom .

OTHER PUBLICATIONS

JP A 61 212156 (NEC Corp.) Sep. 20, 1986.
English abstract of 63-142948, Systm Maintenance System.
English abstract of 61-116494, Covered Equipment Data Automatic Compiling/Exchanging System.
English abstract of 55-85185, Forming System of Mounting Information of Electronic Exchange System.
English abstract of 53-95521, Printed Circuit Board Capable For Live Line Connection and Removal.
English abstract of 53-116004, Block System For Unit Circuit.

Primary Examiner—Paul V. Kulik
Attorney, Agent, or Firm—Staas & Halsey

[57] ABSTRACT

Upon receipt of a request to change a connection from a lower processing unit (24-2), a higher processing, unit (23-1) informs, a management processor (20) of the request and receives an acknowledgment signal therefrom. A disconnect signal is produced when the lower processing unit (24-2) is separated from the higher processing unit (23-1) and sent to the management processor (20. When a notice that the lower processing unit (24-2) has been connected to processing unit 23-3 is sent to the management processor (20), data is edited by the management processor 20 and the edited data to the processing units (22-2, 23-3). Finally, data for the lower processing unit (24-2) is deleted in the processing units (22-1, 23-1) that are part of the initial connections.

33 Claims, 22 Drawing Sheets

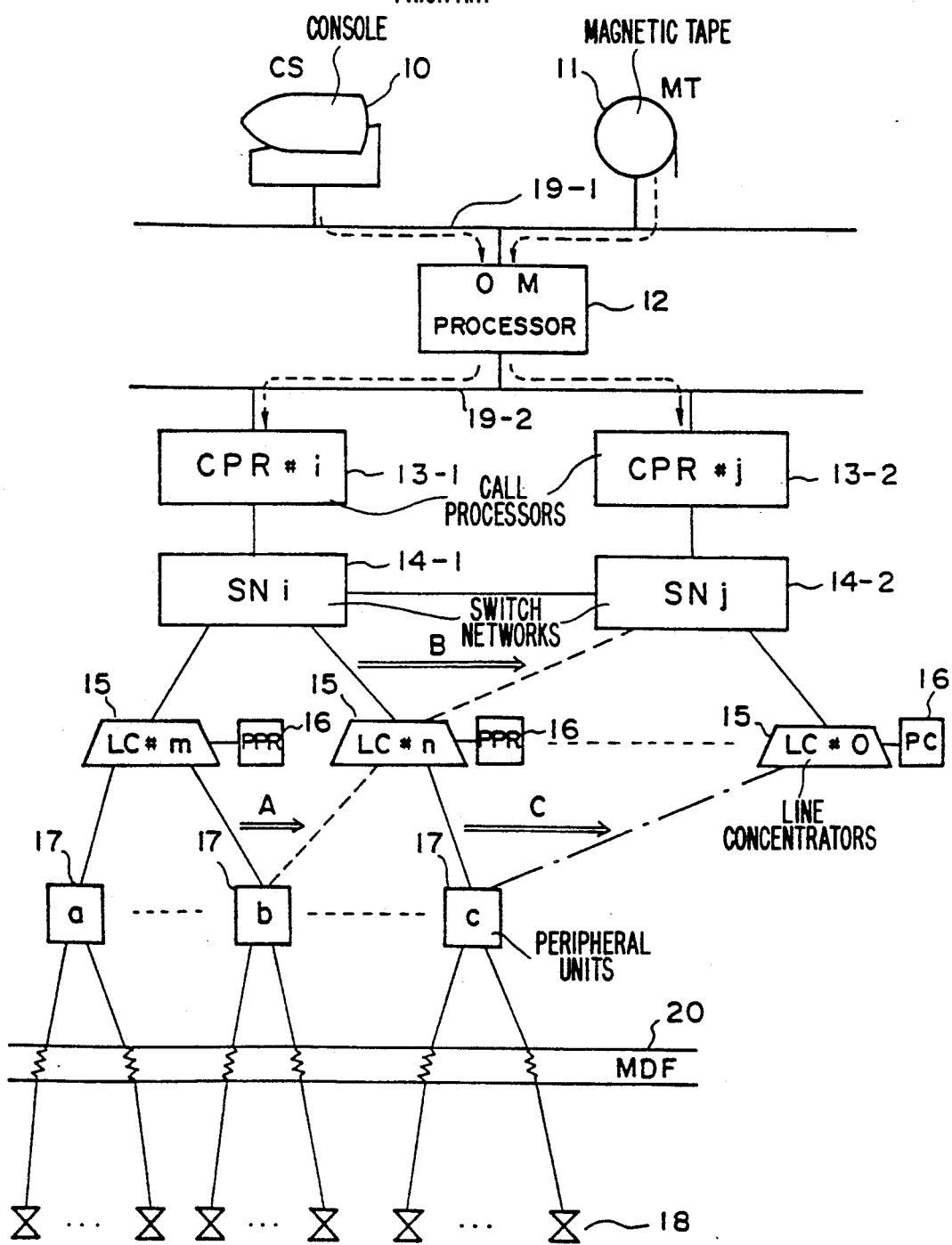

TO HIGHER-ORDER UNIT
( DISTRIBUTION SHELF)

FIG. 10A

CPR i    RPR

| LSW TERMINAL NO. | SHELF NO. | SHELF TYPE | |
|---|---|---|---|
| 0 | 0203-1 | AAAAA | |
| 1 | 0203-2 | BBBBB | |
| 2 | 0203-3 | CCCCC | |
| | | | |

FIG. 10B

SHELF NO.  0203-2

| CARD POSITION | CARD TYPE | | |
|---|---|---|---|
| 1 | XXXX | | |
| 2 | XXXX | | |
| 3 | XXXX | | |
| 4 | XXXX | | |
| 5 | XXXX | | |
| 6 | XXXX | | |
| 7 | XXXX | | |
| | | | |

FIG. 11A

CPR i

| SN TERMINAL NO. | SHELF NO. | SHELF TYPE |  |
|---|---|---|---|
| 0 | 0307-1 | DDDDD |  |
| 1 | 0307-2 | DDDDD |  |
|  |  |  |  |

FIG. 11B

SHELF No. 0307-2

| CARD POSITION | CARD TYPE |  |
|---|---|---|
| 1 | XXXX |  |
| 2 | XXXX |  |
| 3 | XXXX |  |
|  |  |  |

| UNIT NO. | ATTRIBUTION | |  |
|---|---|---|---|
|  | TYPE | TRIPARTITE |  |
| 0203-2-1-1 |  | O |  |
| 0203-2-1-2 |  | X |  |
| 0203-2-1-3 |  | X |  |
|  |  |  |  |

FIG. 12

| SUBSCRIBER NO. | CPR No. | PPR No. | UNIT NO. | ATTRIBUTION | |
|---|---|---|---|---|---|
| | | | | CALL WAITING | |
| XXX-XXXX | 1 | 0 | 0203-2-1-1 | O | |
| XXX-XXXX | 1 | 0 | 0203-2-1-2 | X | |
| XXX-XXXX | 1 | 1 | 0203-2-1-3 | X | |
| | | | | | |

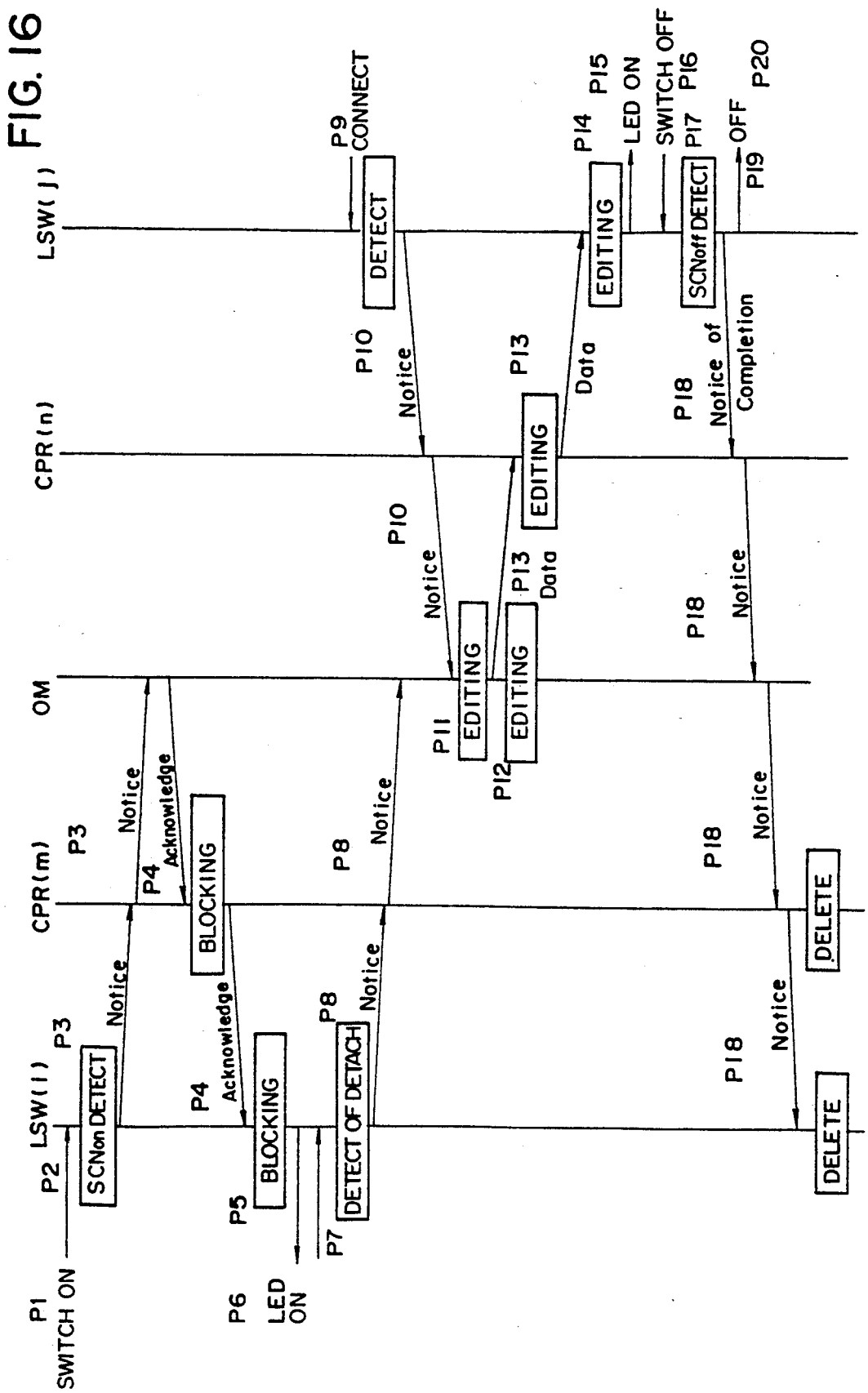

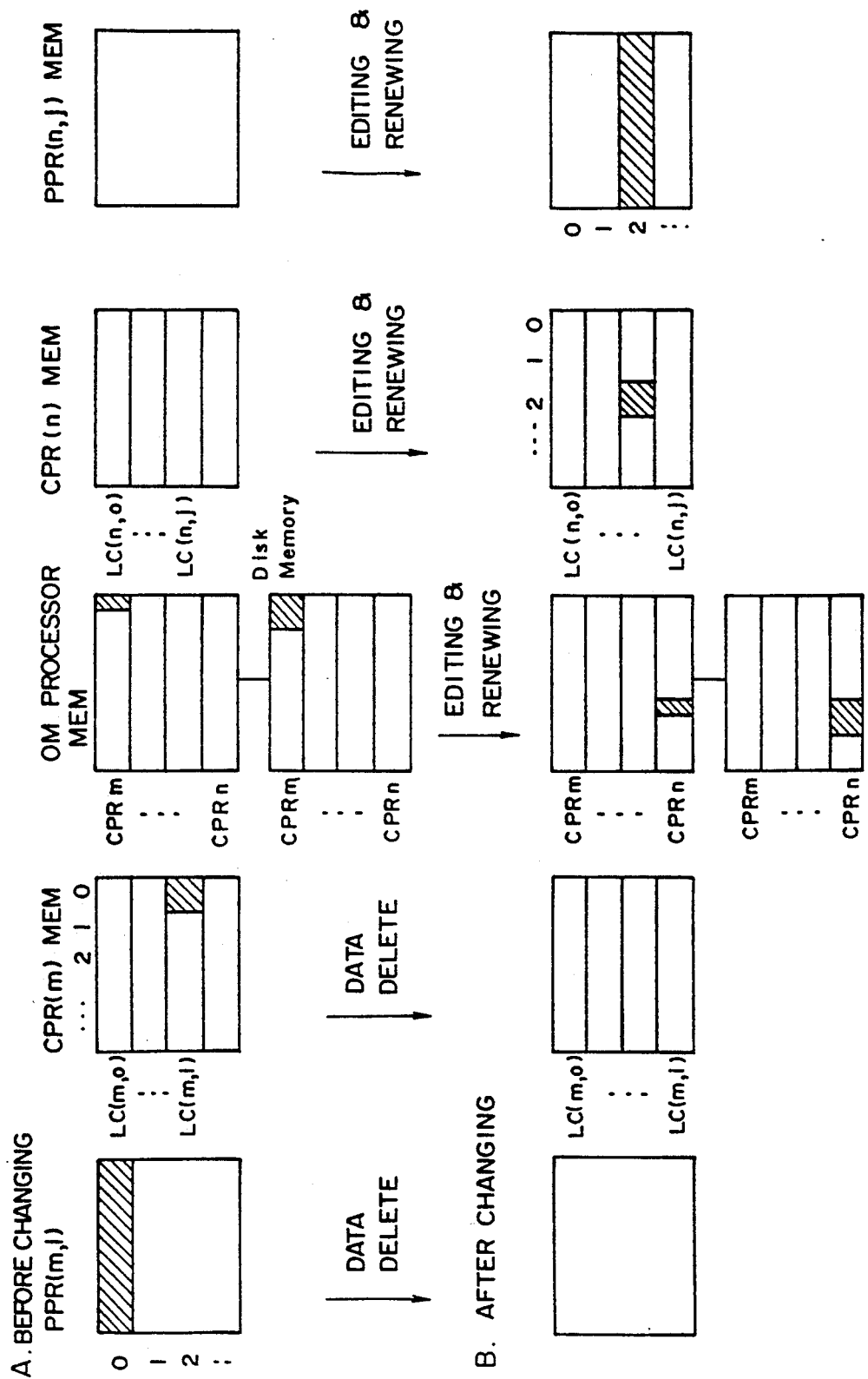

| LSW TERMINAL NO. | SHELF NO. |
|---|---|
| 0 | 0203-1 |
| 1 | 0203-2 |
| 2 | 0203-3 |

CPR m, PPR i

| LSW TERMINAL NO. | SHELF NO. |
|---|---|
| 0 | 0301-2 |
| 1 | 0301-3 |
| 2 |  |

CPR n, PPR j

| LSW TERMINAL NO. | SHELF NO. |
|---|---|
| 0 | 0203-1 |
| 1 |  |
| 2 | 0203-3 |

| LSW TERMINAL NO. | SHELF NO. |
|---|---|
| 0 | 0301-2 |
| 1 | 0301-3 |
| 2 | 0203-2 |

| SUBSCRIBER NO. | CPR No. | PPR No. | UNIT NO. | Call Waiting | |
|---|---|---|---|---|---|
| XXX-XXXX | m | i | | O | ... |
| XXX-XXXX | m | i | | X | ... |
| XXX-XXXX | m | i | | X | ... |
| | | | | | ... |

| SUBSCRIBER NO. | CPR No. | PPR No. | UNIT NO. | Call Waiting | |
|---|---|---|---|---|---|
| | n | j | | | ... |
| | n | j | | | ... |
| | n | j | | | ... |
| | | | | | |

METHOD OF AUTOMATICALLY EDITING DATA FOR MANAGING PROCESSOR THAT CARRIES OUT DISTRIBUTED CONTROL AND A SYSTEM USING THE SAME

FIELD OF THE INVENTION

The present invention relates to a method of automatically editing data for managing a processor that carries out distributed control and to a system using this method. More particularly, the present invention is concerned with a method of automatically editing office data handled in a hierarchical storage program control system which accommodates a large number of terminals and handles a load occurring at random, and to a system using this method.

There are known program control systems in which a load is subjected to a distributed processing by a plurality of sub-systems under the control of a central processing unit. Some of such systems have a hierarchical structure where a plurality of sub-systems have lower-order sub-systems. In such a system, structural units (including a low-order unit having a processor) are arranged in each layer of the hierarchical structure on the basis of a predicted load. It is necessary to reconstruct the system if a real load applied to the system after starting the operation thereof is different from the predicted load, or processing is not balanced over the sub-systems. In the above-mentioned system, data relating to all units are stored in a memory managed by the central processing unit. Thus, it is necessary to modify data managed by the central processing unit when reconstructing the system. This takes a large amount of time and requires much labor. Thus, an improvement in the hierarchical structure is desired.

DESCRIPTION OF THE RELATED ART

FIG. 1 is a block diagram of an exchange system which is a conventional program control system. The illustrated system is configured as follows. A console (CS) 10 is connected to a bus 19-1, and is operated by a craft person. A magnetic tape unit (MT) 11 is connected to the bus 19-1 and stores files of office data relating to all structural elements necessary to operate the system. An operation/maintenance processor (hereafter simply referred to as an OM processor) is connected to the buses 19-1 and 19-2, and controls data exchange between the console 10 and the magnetic tape unit 11 and communication between call processors 13-1 (CPR#i) and 13-2 (CRP#j) connected to the bus 19-2. The call processors 13-1 and 13-2 control switch networks 14-1 (SNi) and 14-2 (SNj), respectively. A plurality of line concentrators 15 (LC#m, LC#n, ..., LC#0) are connected to the switch networks 14-1 and 14-2. Each of the line concentrators 15 is controlled by a peripheral processor (PPR) 16. Each of the line concentrators 15 accommodates a plurality of peripheral units (a, b, c ..) 17. Each of the peripheral units 17 accommodates a plurality of terminals (telephone sets, for example) 18 through a distributing frame (MDF) 20.

Each of the peripheral units 17 has a package structure (generally called a card) which accommodates a large number of subscriber line circuits. Each of the peripheral units 17 multiplexes signals from the terminals 18 with time division, and supplies a corresponding one of the line concentrators 15 with a multiplexed signal. Each of the line concentrators 15 mutually connects the peripheral units 17 and connects ones of the peripheral units 17 to a corresponding one of the switch networks 14-1 and 14-2 under the control of the associated peripheral processor 16. Call processors 13-1 and 13-2 control the switch networks 14-1 and 14-2 so as to establish a communication path between the different line concentrators 15 within the same switch network 14-1 or 14-2 or a communication path between the switch networks 14-1 and 14-2 in response to a request from each of the line concentrators 15. Each of the call processors 13-1 and 13-2 has a built-in memory, which stores office data relating to lower-order peripheral processors 16 and the peripheral units 17 which is necessary to form the aforementioned communication paths. Office data is defined as data relating to the types of units, characteristics (applications) thereof, number of units, and arrangement relationships between the units. Similarly, each of the peripheral processors 16 has an internal memory, which stores office data relating to the type of each peripheral unit 17 which is a low-order unit with respect to the line concentrators 15, number of the peripheral units 17 and arrangement relationships therebetween. The OM processor 12 has an internal memory, which stores office data relating to all the units which are managed by the OM processor 12. The OM processor 12 reads out necessary data from the internal memory and executes a processing. The magnetic tape unit 11 always stores, as backup data, office data which is the same as that stored in the internal memory of the OM processor 12.

When an unbalance in load (an excessively increased or decreased amount of load, an increase or decrease in the number of terminals, or the like) occurs in the system shown in FIG. 1 which is while operating, programs and/or hardware of the system become in surplus or short supply. This causes an increase of the cost or provides degraded services.

Conventionally, to cope with the above-mentioned problems, the system is reconstructed in accordance with the following procedure. FIG. 1 also illustrates a reconstruction procedure for changing the system configuration at different portions A, B and C. Reference A illustrates a case where the peripheral device 17 having a label b connected to the line concentrator 15 having #m is detached therefrom and is then connected to the line concentrator 15 having #n. Reference B illustrates a case where the line concentrator 15 having #n connected to the switch network (SNi) 14-1 is detached therefrom and is then connected so as to be accommodated by the switch network 14-2 (SNj). Reference C illustrates a case where the peripheral unit 17 labeled c is moved so as to be connected to the line concentrator 15, having #0.

Conventionally, to accomplish such a system reconstruction, the original design drawings of the system are modified while actually changing connections and office data are created based on the modifications. When the modifications are of a large scale, a computer is used for creating office data. When the modifications are not of a large scale, data is manually input from the console 10 and then processed by the OM processor 12 so that the contents of the internal memory thereof are edited and renewed. The OM processor 12 informs each of the call processors 13-1 and 13-2 which are distribution processing processors, of the renewal of office data so that office data managed by the call processors 13-1 and 13-2 are renewed. The call processors 13-1 and 13-2 inform the peripheral units 16 connected to the line concentrators 15 of the renewal of office data, so that the contents of the peripheral units 16 are renewed.

However, the aforementioned conventional system has the following disadvantages.

First, it is impossible to change the connection of units to be changed while office data is modified. That is, the craft person changes the connections of units and thereafter inputs necessary data through the console 10. Alternatively, after changing the connections of units, the craft person inputs a new file of office data so that office data is renewed. Thus, it is desired that unit changing operation be made simpler.

Second, data changing operation much depends on manual operation of the craft person. From this point of view, there is a possibility that a large number of errors due to the manual operation occurs.

Third, it takes a large amount of time to modify office data. Units to be changed in connection are not available until the data modification is completed. For this reason, services relating to the units to be changed are not provided until the data modification is completed.

A general object of the present invention is to provide a method of automatically editing office data and a system using the same in which the aforementioned disadvantages are eliminated.

A more specific object of the present invention is to provide a method of automatically editing office data and a system using this method in which a request to change connection is generated by a unit to be moved and office data provided at each layer of the hierarchical structure is automatically modified so that the craft person can obtain a confirmation, from a high-order unit, showing that corresponding office data has been revised.

SUMMARY OF THE INVENTION

The present invention is a method of automatically editing data for managing a plurality of processing units hierarchically provided in a system. The system has a management processor which has data for managing the plurality of processing units, a high-order processing unit of the processing units having data for managing a low-order processing unit of the processing units. The method of the present invention involves the following steps. The high order processing unit, unit determines whether a request to change connection of the low-order processing unit is generated and notifies the management processor that the low-order processing unit (request source) has generated the request.

The management processor sends an acknowledgement signal to the request source, the low-order processing unit of the request which detaches source from the system and sends and acknowledgement signal to the management processor through the high-order processing unit.

The management processor then determines the low-order processing unit of the request source is newly connected to one of the processing units. Finally, data is deleted, edits data relating to the low-order processing unit of the request source to generate edited data, transfers the edited data to a different high-order processing unit associated with one of the processing units to which the low-order processing unit of the request source is newly connected, and notifies the low-order processing unit of the request source that the request to change connection is completed.

Step (g) deletes data relating to the low-order processing unit of the request source, the data in the high-order processing unit to which the low-order processing unit is previously connected.

The system using the method of the present invention is as follow

The system processing units connected so as to form a hierarchical structure, and a management processor connected to ones of the processing units located at the highest layer level. The management processor manages the processing units and stores data used for managing the processing units. The processing units s as high-order processing units or low-order processing units in the hierarchical structure.

Each of the processing units serving as low-order processing units generates a request to change connection in the system, provides a craft person with an indication based on an acknowledgement signal or a confirmation signal derived from the management processor, generates a signal when it is detached from the system or when it is connected to the system again.

Each of the processing units serving as the high-order processing units determines whether one of the related low-order processing units has generated the request and informs the management process of the the request, and stores the data used for managing the related low-order processing units.

The management processor supplies the acknowledgement signal to the one of the low-order processing units which has generated the request when the management processor is informed of the request. The management processor also edits the data related to the one of the low-order processing units which has generated the request when the management processor receives the signal that the low-order processing unit is detached, to thereby generate edited data. Finally, the management processor sends the edited data together with the acknowledgement signal to ones of the high-order processing units related to the one of the low-order processing units which has been detached from and then connected to the system when the management processor receives the signal that the lower order processing unit is again connected to the system. The data management by this high-order processing units is thereby revised based on the edited data supplied from the management processor.

BRIEF DESCRIPTION OF THE DRAWINGS

FIG. 1 is a block diagram of a conventional system structure;

FIGS. 10A and 10B are diagrams illustrating an example of office data stored in an internal memory of a peripheral processor;

FIGS. 11A, 11B and 11C are diagrams illustrating an example of office data stored in an internal memory of a call processor;

FIG. 12 is a diagram illustrating an example of office data stored in an internal memory of an OM processor;

FIG. 16 is a diagram of a sequence of the operation of an embodiment according to the present invention;

FIG. 17 is a diagram illustrating a change in office data stored in an internal memory provided in each associated element;

DESCRIPTION OF THE PREFERRED EMBODIMENTS

Figure 2A:
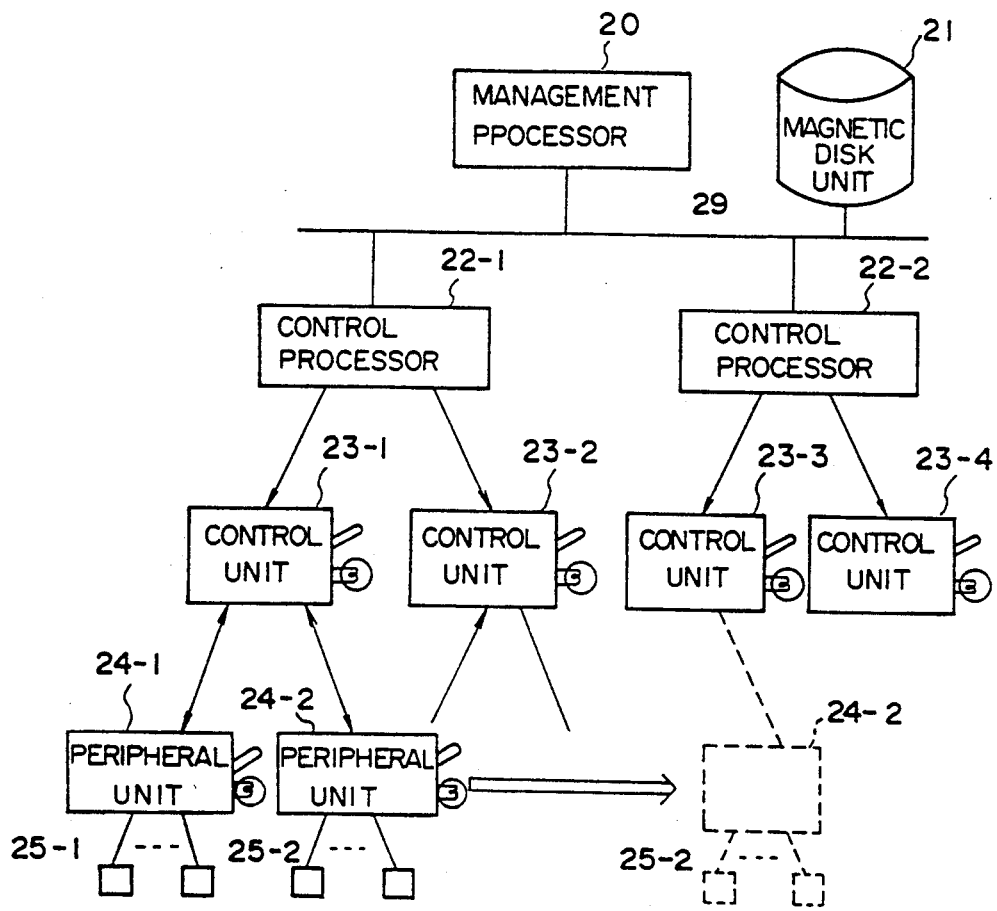
FIG. 2A is a block diagram of a basic structure of the present invention.
Figure 2B:
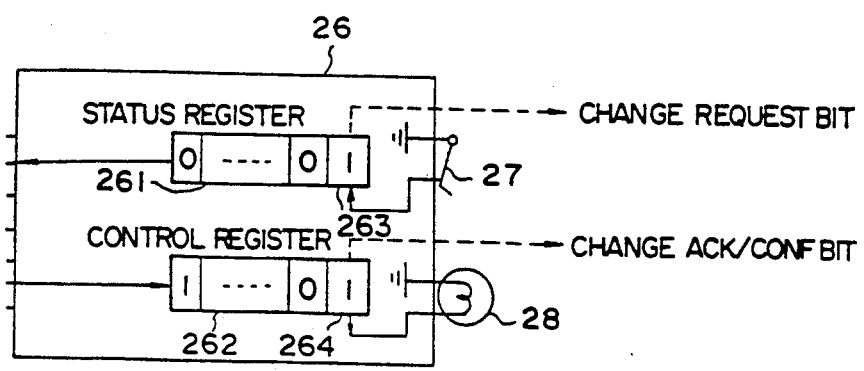
FIG. 2B is a diagram illustrating an essential part of a unit used in the basic structure shown in FIG. 2A.

First, a description is given of a basic structure of the present invention with reference to FIGS. 2A and 2B.

Referring to FIG. 2A, a management processor 20 manages control processors 22-1 and 22-2. Further, the management processor 20 has an internal memory (not shown), which stores office data relating to structural elements of the entire system. A magnetic disk unit 21 stores, as backup data, office data which is the same as that stored in the internal memory of the management processor 20. The control processor 22-1 manages control units 23-1 and 23-2, and has an internal memory (not shown), which stores office data necessary for managing the control units 23-1 and 23-2. Similarly, the control processor 22-2 manages control units 23-3 and 23-4, and has an internal memory (not shown), which stores office data necessary for managing the control units 23-3 and 23-4. The control unit 23-1 has a processor (not shown) which manages peripheral units 24-1, 24-2, . . . connected thereto. This processor has an internal memory (not shown), which stores office data necessary for managing the peripheral units 24-1, 24-2, . . . The control units 23-2, 23-3 and 23-4 are configured in the same way as the control unit 23-1. The peripheral units 24-1 and 24-2 which are managed by the control unit 23-1 manage a plurality of terminals 25-1 and 25-2, respectively. Similarly, peripheral units 23-3 and 23-4 managed by the control units 23-3 and 23-4 manage a plurality of terminals (not shown).

Each of the control units 23-1 - 23-4 and the peripheral units 24-1, 24-2, . . . is packaged (card), and is detachably provided in a shelf (not shown). Further, each of the control units 23-1 - 23-4 and the peripheral units 24-1, 24-2, . . . is changeable in connection to the system, and has a structure shown in FIG. 2B. The structure shown in FIG. 2B is used when the connections of units to the system are changed, and is achieved by a part of or added to the original structure of each of the control units 23-1 - 24-4 and the peripheral units 24-1, 24-2, . . .

Referring to FIG. 2B, a unit 26 corresponds to each of the control units 23-1 - 23-4 and the peripheral units 24-1, 24-2, . . . The unit 26 includes a switch 27, an indicator 28, a status register 261 having a change request bit 263 for requesting change connection, and a control register 262 having a change acknowledgement-/confirmation bit 264 indicating the confirmation of change. The status register 261 and the control register 262 are conventionally used and are newly assigned the change request bit 263 and the change acknowledgement/confirmation bit 264.

According to the present invention, when changing connection of the connection changeable unit 26, the craft person turns ON the switch 27 of the unit 26 so that a connection changing request is issued to a higher-order unit. The unit 26 receives an acknowledgement signal indicating that the request has been accepted, and turns ON the indicator 28. The higher-order unit reads out data relating to the unit 26 from its own internal memory and sends the data to a unit which functions as a higher-order unit (including the management processor 20) after the connection change. Thereby, the content of the memory of each higher-order unit is renewed.

By way of example, a description is given of a case where the peripheral unit 24-2 shown in FIG. 2A (equipped with the structure of the unit 26 shown in FIG. 2B) is detached from the system and connected to the control unit 23-3. The craft person turns ON the switch 27 of the peripheral unit 24-2. Thereby, the change request bit 263 of the status register 261 is set to "1". The contents of the status register 261 of the peripheral unit 24-2 are supervised by periodically scanning the status register 261. When scanning the status register 261, the control unit 23-1 renews status information about the peripheral unit 24-2 stored in the internal memory thereof. In this case, since the change request bit 263 is "1", the control unit 23-1 lets the control processor 22-1 and the management processor 20 know, through a communication path (illustrated by the solid line), that the request to change connection has been generated by the peripheral unit 24-2. Then the management processor 20 identifies the unit which has generated the request to change connection from the received data, and writes the recognized result into a predetermined area of the internal memory thereof. Then the management processor 20 sends back an acknowledgement signal indicating that the request has been accepted to the control processor 22-1. This acknowledgement is formed by using a predetermined bit in the control information. When receiving the acknowledgement, the control processor 22-1 sets data relating to the peripheral unit 24-2 to a closed state (inhibiting data from being used) so that the data is blocked. Then the control processor 22-1 sends an acknowledgement to the control unit 23-1.

When receiving the acknowledgement from the control processor 22-1, the control unit 23-1 sets data relating to the peripheral unit 24-2 held thereby to the closed state. Then the control unit 23-1 sends control information including the acknowledgement to the peripheral unit 24-2. By the acknowledgement contained in the control information, the change acknowledgement-/confirmation bit 264 in the control register 262 shown in FIG. 2B is set to "1". Thereby, the indicator 28 turns ON so that the craft person is informed that the management processor 20 has accepted the request to change connection.

Next, the craft person detaches the peripheral unit 24-2 from the control unit 23-1 while the switch 27 thereof is held ON, and then connects the same to the control unit 23-3. The control unit 23-1 detects, by supervising the status of the associated status register 261, that the peripheral unit 24-2 has been detached therefrom. Then the control unit 23-1 lets the highest-order unit (that is, the management processor 20) know that the peripheral unit 24-2 has been detached. When receiving this notice from the control unit 23-1 through the control processor 22-1, the management processor 20 edits office data relating to the peripheral unit 24-2 by utilizing the magnetic disk unit 21.

Once the peripheral unit 24-2 is connected to the control unit 23-3, a power supply loop including the switch 27 thereof is formed because the switch 27 of the peripheral unit 24-2 is held in the closed state (ON state). Thereby, the change request bit 263 in the status register 261 is set to "1". The control unit 23-3 detects, by the periodical scan, that the change request bit relating to the peripheral unit 24-2 is changed to "1", and lets the management processor 20 know this change through the control processor 22-2. When receiving the notice from the control unit 23-3, the management processor 20 edits office data relating to the peripheral unit 24-2 which is prepared in its internal memory in advance. Then the management processor 20 sends edited office data relating to the peripheral unit 24-2 to the control processor 22-2 and the control unit 23-3. The control processor 22-2 and the control unit 23-3 edit and renew the office data of the individual internal memories in accordance with the received edited office data. Then the indicator 28 of the peripheral unit 24-2 connected to the control unit 23-3 turns ON so that the craft person can confirm that the data editing resulting from the requested connection change is completed. When the craft person turns OFF the switch 27 of the peripheral unit 24-2, the change request bit 263 is set to "0". The management processor 20 is informed, through the control unit 23-3 and the control processor 22-2, that the change request bit becomes OFF. Then the management processor 20 sequentially sends a procedure completion notice to the control processor 22-2 and the control unit 23-1 which were associated with the peripheral unit 24-2 before changing the connection thereof. Then the office data relating to the peripheral unit 24-2 are deleted from the internal memories of the control processor 22-1 and the control unit 23-1.

A description is given of a preferred embodiment of the present invention.

Figure 3:
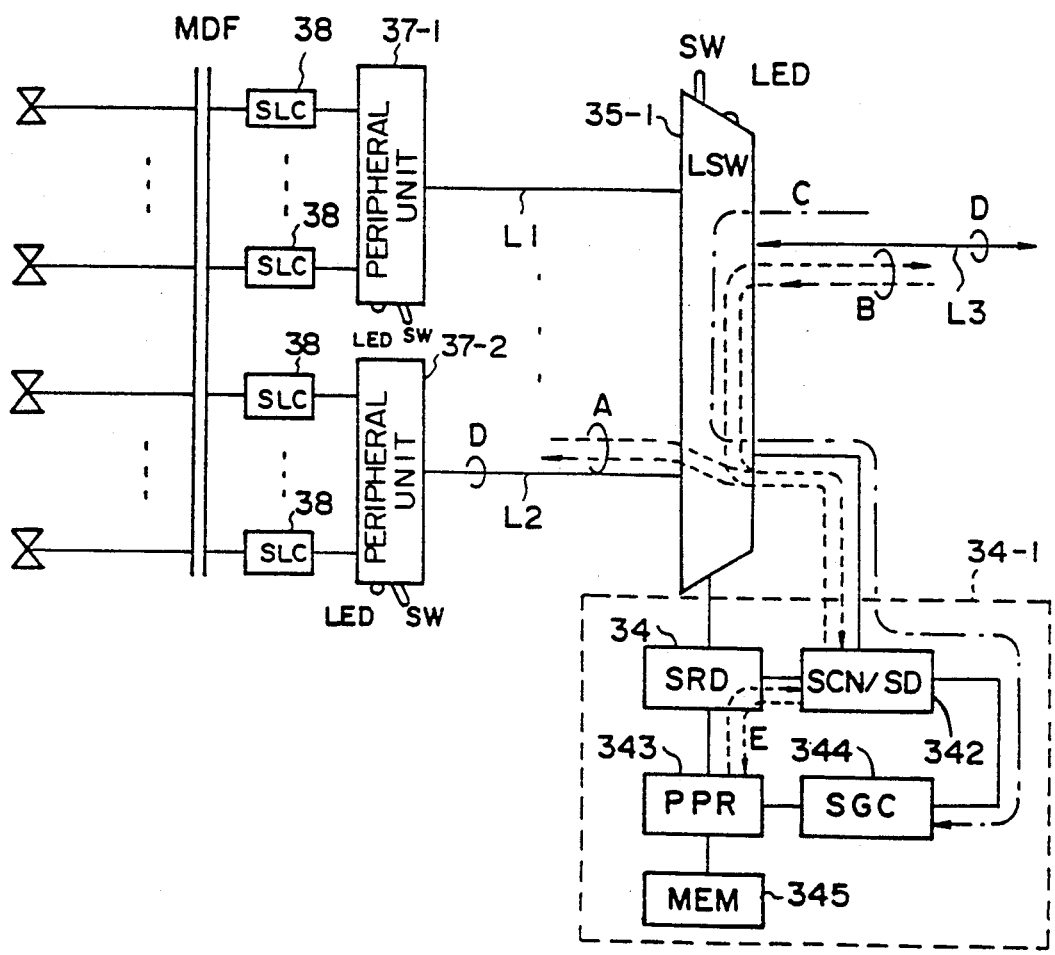
FIG. 3 is a block diagram of a structure obtained by applying the present invention to a peripheral unit and a line concentrator of an exchange system according to the present invention.

FIG. 3 is a block diagram of a structure obtained by applying the present invention to an exchange system which includes peripheral units and a line concentration unit. Peripheral units 37-1 and 37-2 individually accommodate a plurality of subscriber line circuits (SLC) 38. Terminals (such as telephone sets) are connected to the subscriber line circuits 38 through a distribution frame MDF. The peripheral unit 37-2 which accommodates the subscriber line circuits 38 is provided in common to the subscriber line circuits 38. Thus, hereinafter, each of the peripheral units 37-1 and 37-2 is called a subscriber line circuit common part (or SLC common part). Each of the subscriber line circuit common parts 37-1 and 37-2 multiplexes signal lines extending from the subscriber line circuits 38 and demultiplexes an incoming signal line so that signal lines individually addressed to the subscriber line circuits 38 are formed. Each of the subscriber line circuit common parts 37-1 and 37-2 has a switch SW and a light-emitting diode LED. The switch SW and the light-emitting diode LED function as the switch 27 and the indicator 28 shown in FIG. 2B, respectively. Of course, the indicator 28 may be formed by an alternative light-emitting element.

A line concentration switch (LSW) 35-1 multiplexes signal lines L1 and L2 and accommodates the subscriber line circuit common part 37-1 and 37-2. The line subscriber switch 35-1 has a switch SW and a light-emitting diode LED. A peripheral processor 34-1 is connected to the line concentration switch 35-1. The peripheral processor 34-1 is configured as follows. A signal reception/distribution device (SRD) 341 sends and receives a signal for forming a communication path within the line concentration switch 35-1 as well as signals supplied from or to each terminal (telephone set) and a higher-order switch network through a scanner/signal distribution memory 342. The scanner/signal distribution memory 342 accommodates status supervising data (SCN) and control data (SD) related to the subscriber line circuit common parts 37-1 and 37-2. Hereinafter, the scanner/signal distribution memory 342 is simply referred to as a scanner/memory 342. The peripheral processor (PPR) 343 controls the line concentration switch 35-1, and the subscriber line circuit common parts 37-1 and 37-2 under the control thereof. A common line signal control device (SGC) 344 realizes an interface between the scanner/memory 342 and the peripheral processor 343 and communicates with a higher-order processor (not shown).

In FIG. 3, there are illustrated communication paths A, B, C, D and E for transmitting the status supervising data SCN containing the change request bit 263 (FIG. 2B) and the control data containing the change acknowledgement/confirmation bit 264 (FIG. 2B). The path A is provided between the subscriber line circuit common parts 37-1 and 37-2 and the peripheral processor 343. The status supervising data SCN and the control data SD are transmitted on the path A. The path B transmits the status supervising data SCN relating to the line concentration switch 35-1 to a high-order processor (not shown) and receives control data SD which is directed to the line concentration switch 35-1 from the higher-order processor. The status supervising data SCN and the control data SD on the paths A and B are transmitted and received through the scanner/memory 342.

The path C is provided between the line concentration switch 35-1 and the higher-order processor and is used for transmitting and receiving control data, signals for connection change and office data after being edited. The path D is a signal path on which a digital signal such as speech signal is transmitted. The path E is provided between the peripheral processor 343 and the scanner/memory 342.

By using the paths A-E, the change request bit 263, the change acknowledgement/confirmation bit 264 and information about editing of office data transferred between high-order and low-order processors are transferred as follows.

Figure 4:
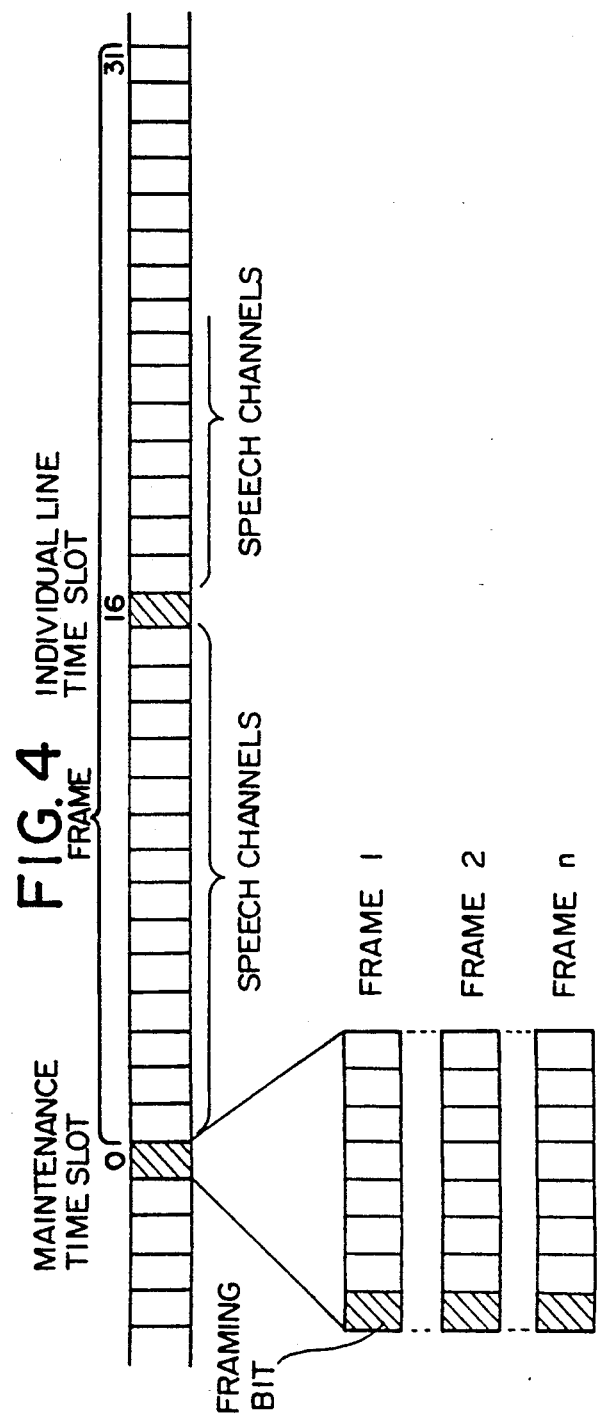
FIG. 4 is a diagram illustrating a multiframe format used for transmitting a change request bit and a change acknowledgement bit.

Each of the paths A-D is a multiplexed transmission line. Normally, a large number of time slots is defined on the multiplexed transmission line. FIG. 4 illustrates a frame format in which one frame is composed of 32 time slots. In this frame format, 30 time slots among the 32 time slots are assigned to speech channels. A zero-th time slot of the remaining two time slots serves as a maintenance time slot for transferring the status supervising data SCN or control data directed to a lower-order unit. A 16-th time slot is used as a time slot for an individual line signal time slot.

The period of the multiplexed signal shown in FIG. 4 is 125 μm, which is less than that of the status supervising data SCN or the control data SD. Thus, specific bits of the change request bit 263 and the change acknowledgement/confirmation bit 264 are assigned to the zero-th time slots of a plurality of frames 1, 2, ..., n. That is, as shown in FIG. 4, each beginning bit of frames 1, 2, ..., n positioned in the zero-th time slots thereof serves as a framing bit and the remaining seven bits of each frame are used for transferring the status supervising data SCN and the control data SD. When a multiframe is composed of n frames, an information amount equal to n×7 bits is transferred. In this manner, the change request bit 263 and the change acknowledgement/confirmation bit 264 are transmitted by using specific bits in the multiframe provided in a specific one-time slot available on the multiplexed transmission lines in the upward and downward directions.

The status supervising data SCN and the control data SD are transferred between the subscriber line circuit common parts 37-1 and 37-2 and the line 5 concentration switch 35-1 through the multiplexed signal paths (A and D shown in FIG. 3). Similarly, the status supervising data SCN and the control data SD are transferred between the peripheral processor 343 associated with the line concentration switch 35-1 and a higher-order processor (not shown) through the multiplexed signal paths (B and D shown in FIG. 3) on a line L3.

Figure 5:
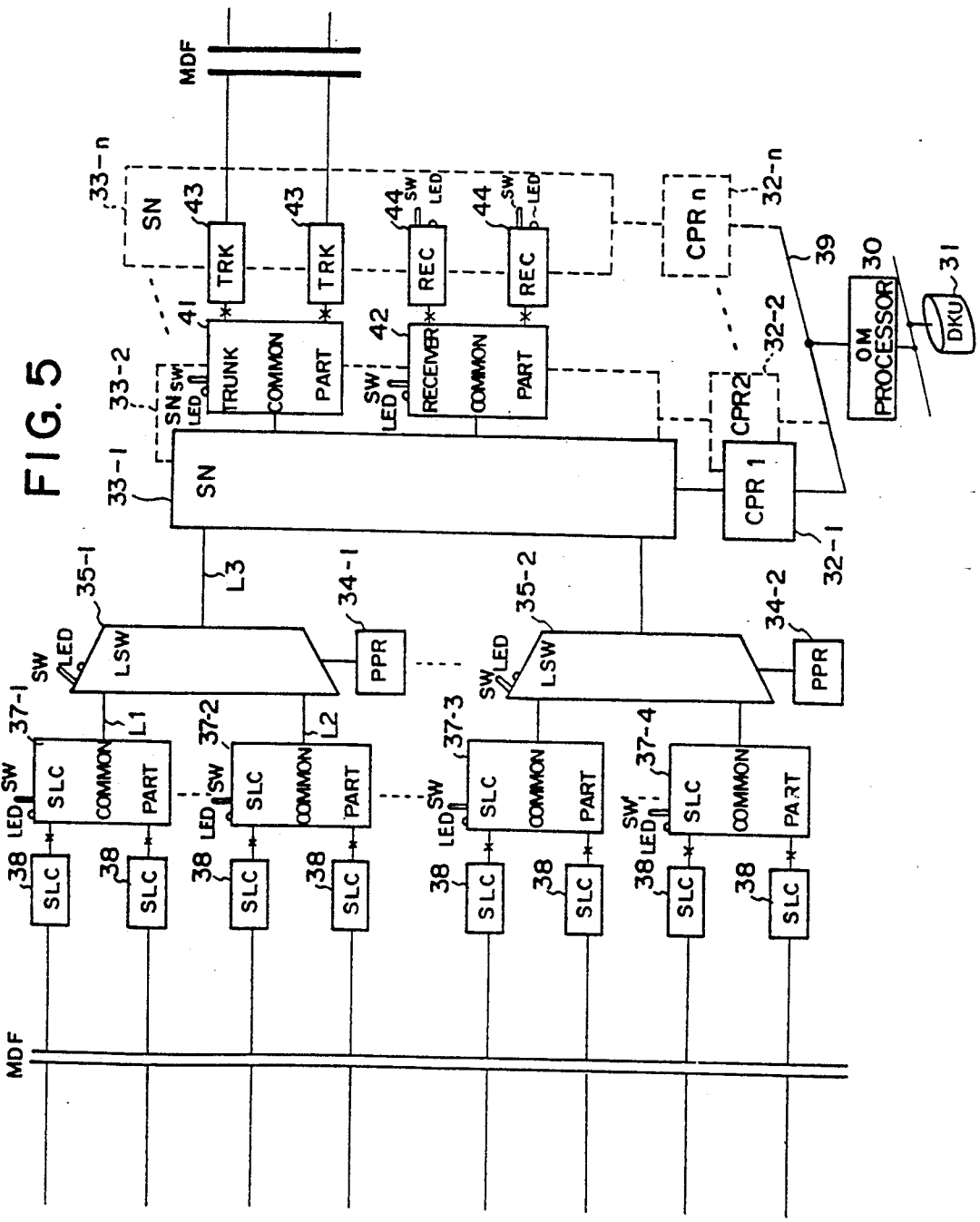
FIG. 5 is a diagram of the entire system structure obtained when the present invention is applied to an exchange system.

FIG. 5 is a block diagram of the entire exchange system having the structure shown in FIG. 3. In FIG. 5, those parts which are the same as those shown in FIG. 3 are given the same reference numerals. Referring to FIG. 5, the exchange system includes a line concentration switch 35-2, a peripheral processor 34-2, subscriber line circuit common parts 37-3 and 37-4, and subscriber line circuits 38. These structural elements are the same as those shown in FIG. 3. The exchange system includes a plurality of switch networks (SN) 33-1, 33-2, ..., 33-n. The switch network 33-1 accommodates the line concentration switches 35-1 and 35-2. The switch network 33-1 has a trunk common part 41 and a receiver common part 42. The trunk common part 41 is provided in common to a plurality of trunks (TRK) 43. The trunks 43 are connected to another exchanger through the MDF. The receiver common part 42 is provided in common to a plurality of tone receivers (REC) 44. Each of the tone receivers 44 is used for receiving a DTMF signal from a telephone set and an MF signal from another office. Each of tone receiver 44 has a switch SW and a light-emitting diode LED. Call processors 32-1, 32-2, ..., 32-n control switch networks 33-1, 33-2, ..., 33-n, respectively. The call processors 32-1, 32-2, ..., 32-n are connected to the OM processor 30 via a bus 31, and are further connected to the magnetic disk unit (DKU) 31 via a bus 39-2.

In FIG. 5, the subscriber line circuits 38, the subscriber line circuit common parts 37-1 - 37-4, the line concentration switches 35-1 and 35-2, the trunk common part 41, the trunks 43, the receiver common parts 42 and the tone receivers 44 are connection changeable elements. In FIG. 5, "x" indicates a connector connection and "−" indicates a line connection. The subscriber line circuits 38 and the trunks 43 are not provided with the switches SW and the light-emitting diodes LED. That is, as far as the illustrated system is concerned, these elements are not connection changeable elements. Alternatively, it is possible to provide the subscriber line circuits 38 and the trunks 43 with the switches SW and the light-emitting diodes LED so that they are provided as connection changeable elements. The above-mentioned elements are provided in shelves accommodated in a bay or packages (cards) accommodated in shelves.

Figure 6:
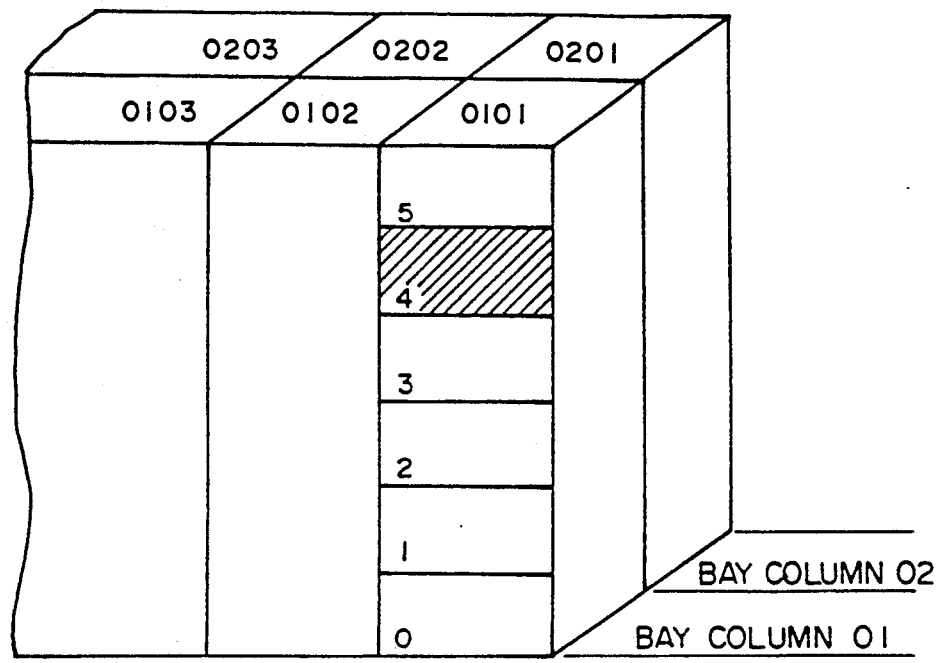
FIG. 6 is a diagram illustrating a physical structure of the exchange system.

FIG. 6 is a diagram illustrating the relationship in physical position between bays and shelves. A bay column numbered 01 has a plurality of bays 0101, 0102, 0103, ... For example, the bay 0101 accommodates six shelves 0–5 (six-step structure). Each shelf can be specified by a bay number and a step number. For example, the hatched shelf is specified by 0101-4. The first two digits of 0101 specify a bay column and the remaining two digits specify a bay.

Shelves are classified into a terminal shelf, a line connection shelf, and a distribution shelf. Terminal shelves are further classified into a subscriber line circuit shelf, a trunk shelf and a tone receiver shelf.

Figure 7:
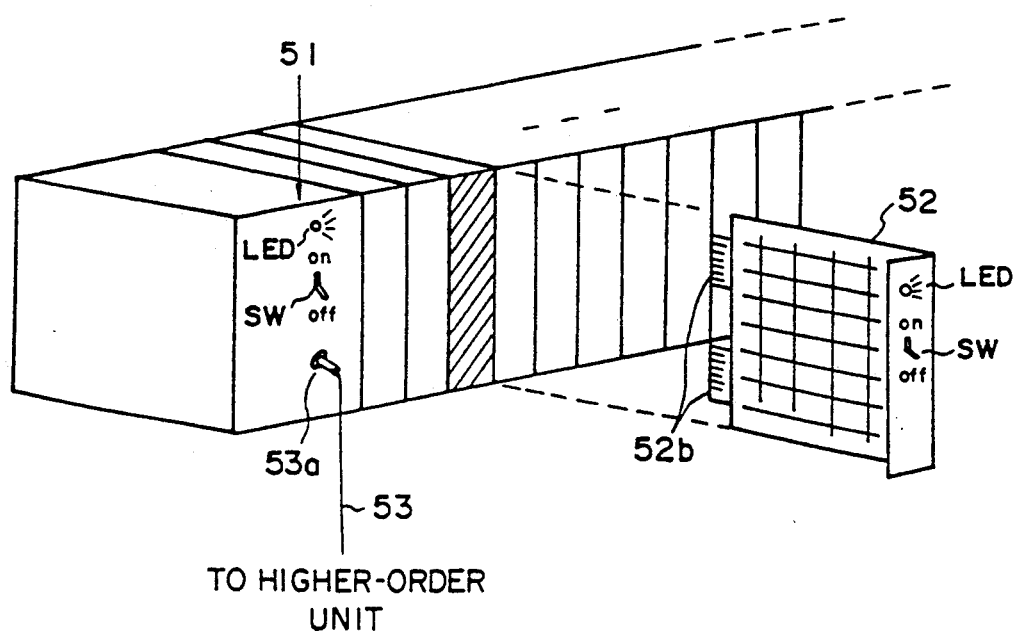
FIG. 7 is a perspective view of a terminal shelf.

FIG. 7 is a perspective view illustrating an essential part of each terminal shelf. The terminal shelf has a terminal shelf common part 51 and a plurality of cards 52. The shelf common part 51 corresponds to each subscriber line circuit common part 37-1 - 37-4, the trunk common part 41 or the receiver common part 42. The shelf common part 51 has a connector 53a, a light-emitting diode LED and a switch SW provided on a front panel thereof. Each of the card 52 corresponds to one of the subscriber line circuits 38, the trunks 43 and the tone receivers 44. Some of the cards 52 have light-emitting diodes LED and switches SW provided on front panels thereof. Some of the cards are not provided with light-emitting diodes LED and switches SW. The shelf common part 51 is connected to a higher-order unit through the connector 53a and an optical fiber cable 53. A higher-order unit with respect to the subscriber line circuit shelf is a line concentration shelf accommodating the line concentration switch 35-1 or 35-2 shown in FIG.5. A higher-order unit with respect to the trunk shelf or tone receiver shelf is a distribution shelf which accommodates the switch network 33-1, 33-2, ..., 33-n shown in FIG. 5.

Figure 8:
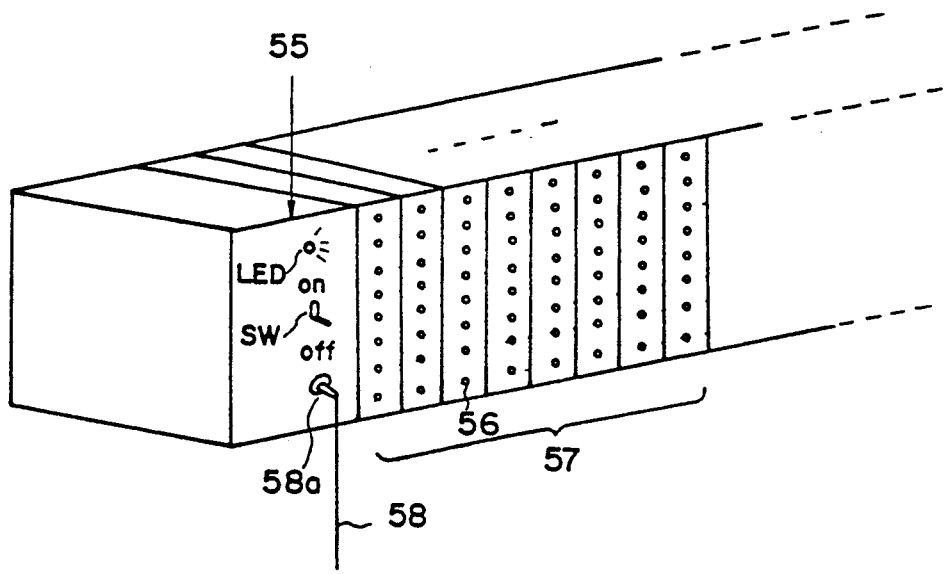
FIG. 8 is a perspective view of a line concentrator shelf.

FIG. 8 is a perspective view of each line concentration shelf. The line concentration shelf has a shelf common part 55 and a group of terminals 56 addressed to lower-order units. The shelf common part 55 has a connector 58a, a light-emitting diode LED and a switch SW provided on a front panel thereof. The shelf common part 55 is connected to a higher-order unit through the connector 58a and an optical fiber cable 58 (corresponding to line L3 shown in FIG.5). The distribution shelf functions to achieve connections with low-order devices so that there is no need for providing switches SW and light-emitting diodes LED having the functions shown in FIG. 2B.

Figure 9:
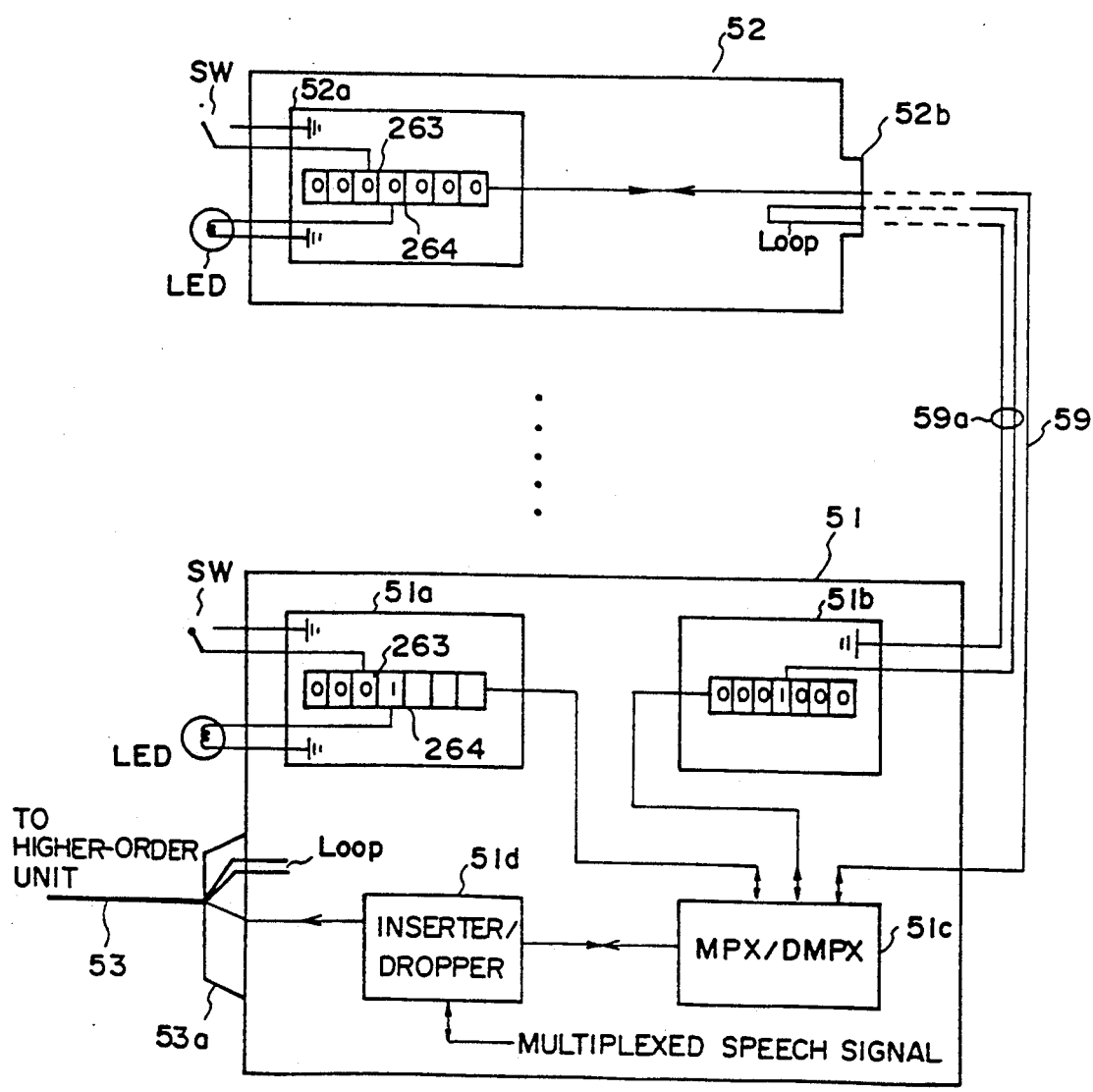
FIG. 9 is a block diagram showing in part a connection changing procedure in a shelf.

FIG. 9 is a circuit diagram of essential parts of the shelf common part 51 and the card 52 shown in FIG. 7. As shown in FIG. 9, the card 52 has a register circuit 52a. The register circuit 52a corresponds to the status register 261 and the control register 262 shown in FIG. 2B. The register circuit 52a has the change request bit 263 and the change acknowledgement/confirmation bit 264. When the card 52 is inserted into a shelf, it is connected to its shelf common part 51 through a connector 52b provided in a back portion of the card 52 and a signal line 59.

The shelf common part 51 has register circuits 51a and 51b, a multiplexer/demultiplexer (MPX/DMPX) 51c and an inserter/dropper 51d. The register circuit 51a corresponds to the status register 261 and the control register 262 shown in FIG. 2B and has the change request bit 263 and the change acknowledgement/confirmation bit 264. The register circuit 51b is used for indicating whether the corresponding card 52 has been inserted into the shelf. When the illustrated card 52 is inserted into the shelf, a power supply loop 59a is formed so that a corresponding bit provided in the register circuit 51b is set to "1". The multiplexer/demultiplexer 51c multiplexes he contents of the register circuits 52a, 51a and 51b and sends a multiplexed signal to the inserter/dropper 51d. Further, the multiplexer/demultiplexer 51c demultiplexes a signal supplied from the inserter/dropper 51d to thereby generate signals to be supplied to the register circuits 52a, 51a and 51b. The inserter/dropper 51d inserts the signal supplied from the multiplexer/demultiplexer 51d into the zero-th time slots of the frame signals including a received multiplexed speech signal (corresponding to the speech channels shown in FIG. 4). Further, the inserter/dropper 51d extracts necessary data from the multiplexed signal received through the optical fiber cable and the connector 53a (at a preceding stage thereto, a photoelectric part is provided although omitted). The extracted data is supplied to the multiplexer/demultiplexer 51c. The connection relationship between the shelf common part 51 and the higher-order unit is the same as that between the shelf common part 51 and the card 52.

As described previously, each of the peripheral processors 34-1 and 34-2 stores, in the memory 345 (shown in FIG. 3), office data relating to structural elements under the control thereof. As shown in FIGS. 10A and 10B, office data is stored in the form of a table. FIG. 10A shows a terminal allocation table relating to the line concentration switch 35-1 or 35-2. This table includes, as data the connector change of connection, a line concentration switch terminal number, a shelf number and a shelf type. The line concentration switch terminal number identifies the individual terminals 56 of the group 57. The shelf number indicates the shelf in which the terminals 56 are accommodated. The shelf type indicates the type of each shelf.

FIG. 10B shows an allocation table which defines positions and types of each card accommodated in the shelf having a shelf number of 0203-1. As described previously, the subscriber line circuits 38 are provided in the cards 52 (FIG. 7).

FIGS. 11A through 11C illustrate an example of office data stored in the internal memories of the call processors 32-1, 32-2, ..., 32-n shown in FIG. 5. FIG. 11A shows an allocation table relating to terminals of the switch network. The table in FIG. 11A defines a switch network terminal number, shelf number and shelf type. The table in FIG. 11A is provided for each switch network. FIG. 11B shows a card allocation table. The table in FIG. 11B is provided for each shelf and defines positions and types of cards in each shelf. FIG. 11C shows a table which defines data relating to caller subscribers necessary for processing calls in the call processors 32-1, 32-2, ..., 32-n. The table shown in FIG. 11C is provided for each shelf, and defines a unit number of a caller and an attribution thereof. The unit number is composed of a shelf number, a card number in the shelf and a circuit number. The attribution defines the type of each caller and indicates whether a tripartite communication is possible.

Data relating to a called subscriber is stored, as specific office data, in the internal memory of the OM processor 30 shown in FIG. 5. FIG. 12 shows a table which stores called subscriber data. The table shown in FIG. 12 defines, for each called subscriber, office data such as a subscriber number of each called subscriber, a call processor number, a peripheral processor number, a unit number and an attribution. The attribution in the table shown in FIG. 12 includes data as to whether the current status of each called subscriber is in a call waiting status.

Figure 13A:
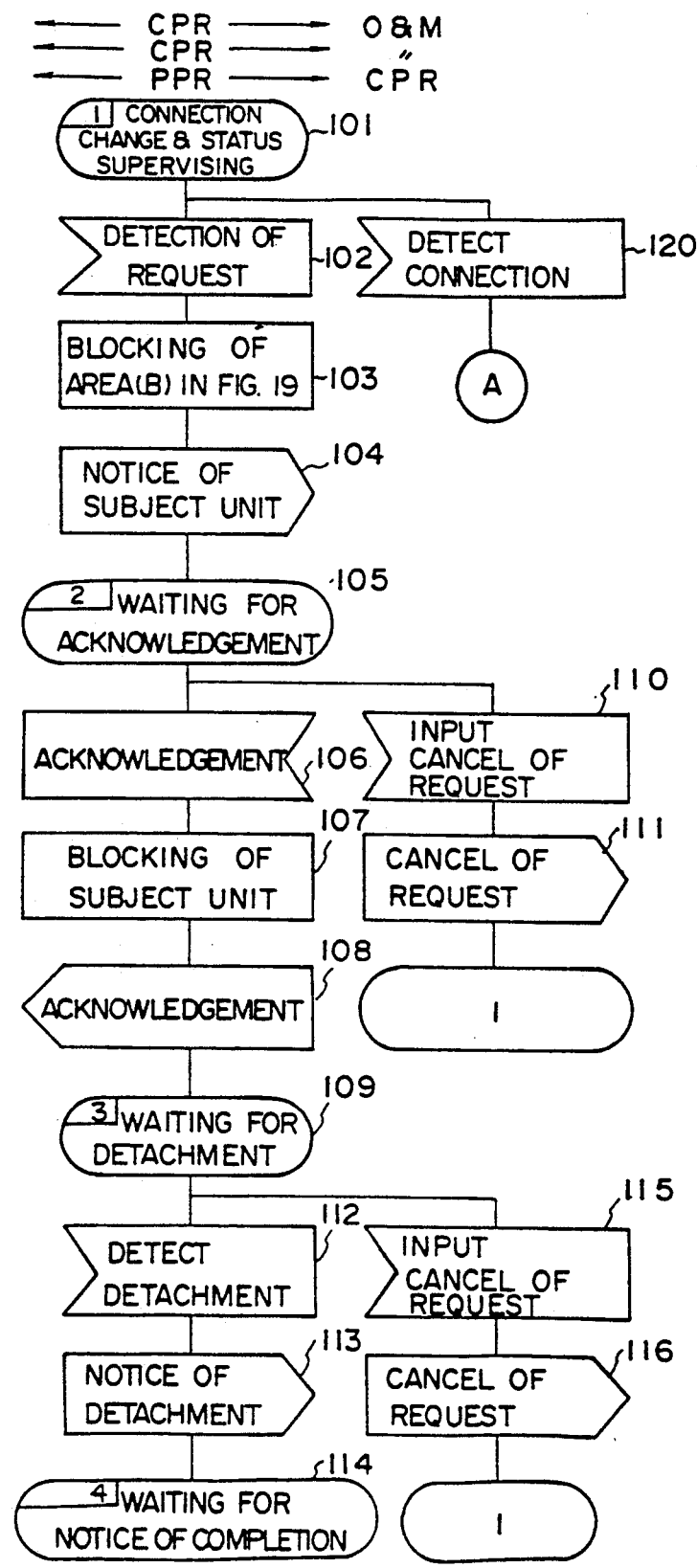
FIGS. 13A, 13B and 13C are flowcharts of a processing in a peripheral processor or a call processor.
Figure 13B:
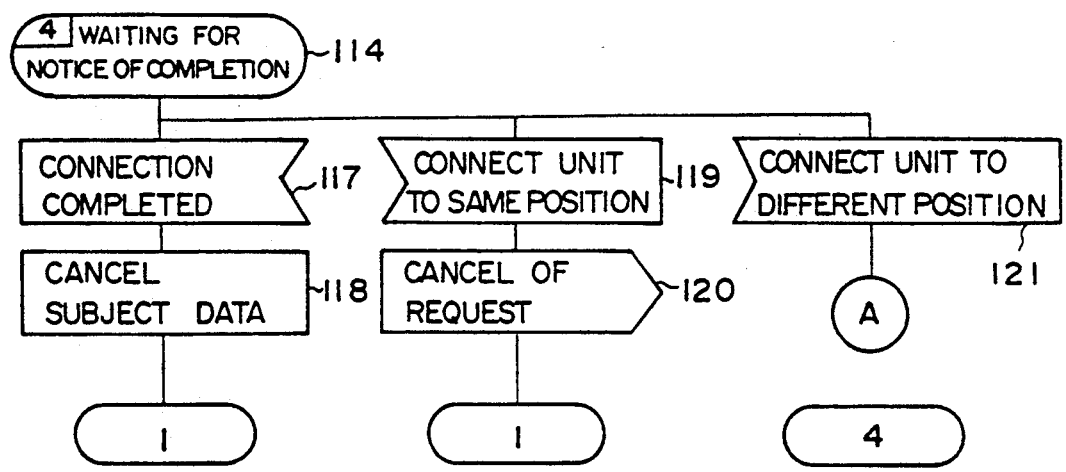
Figure 13C:
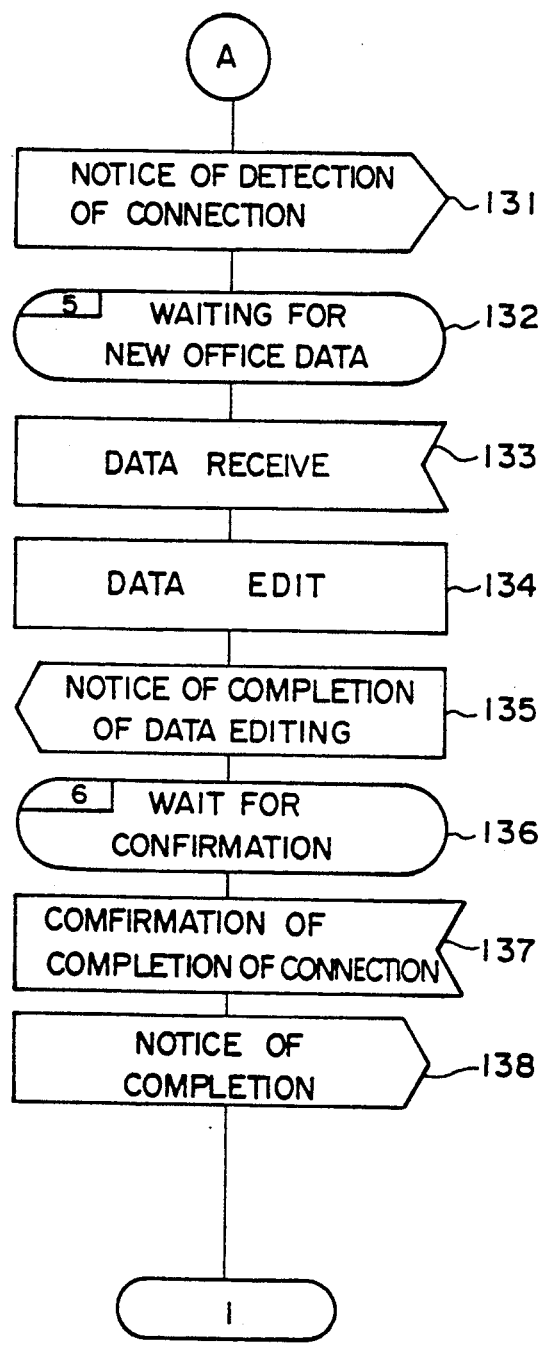
Figure 14:
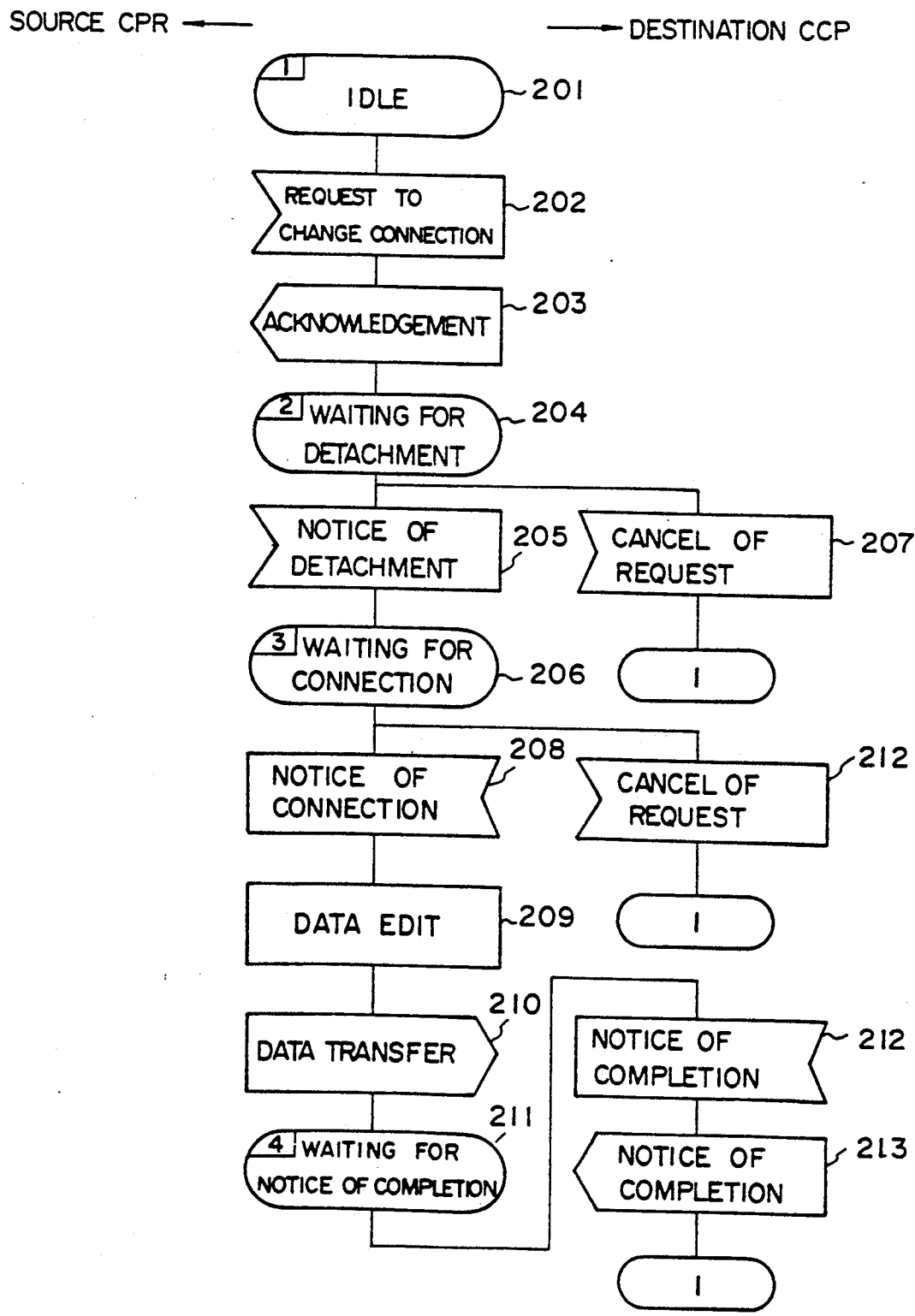
FIG. 14 is a flowchart of a processing by an OM processor.

A description is given of the operation of the embodiment. FIGS. 13A, 13B and 13C are flowcharts of each of the call processors 32-1, 32-2, ..., 32-n and the peripheral processors 34-1 and 34-2. In the following explanation, these processors are simply referred to as processors when a specific note is not provided. FIG. 14 is a flowchart of the operation of the OM processor 30. In FIGS. 13A, 13B and 13C, when the processors are the peripheral processors 34-1 and 34-2, the illustrated procedure relates to a communication between the call processors 32-1, 32-2, ..., 32-n and the craft person (units for which a change of connection is requested). On the other hand, when the processors are call processors 32-1, 32-2, ..., 32-n, the illustrated procedure relates to a communication between the OM processor 30 and the craft person, or a communication between the peripheral processors 34-1 and 34-2 and the OM processor 30. The following description is given to the case where the processor executes a procedure for communication between the craft person and the OM processor 30.

Figure 19:
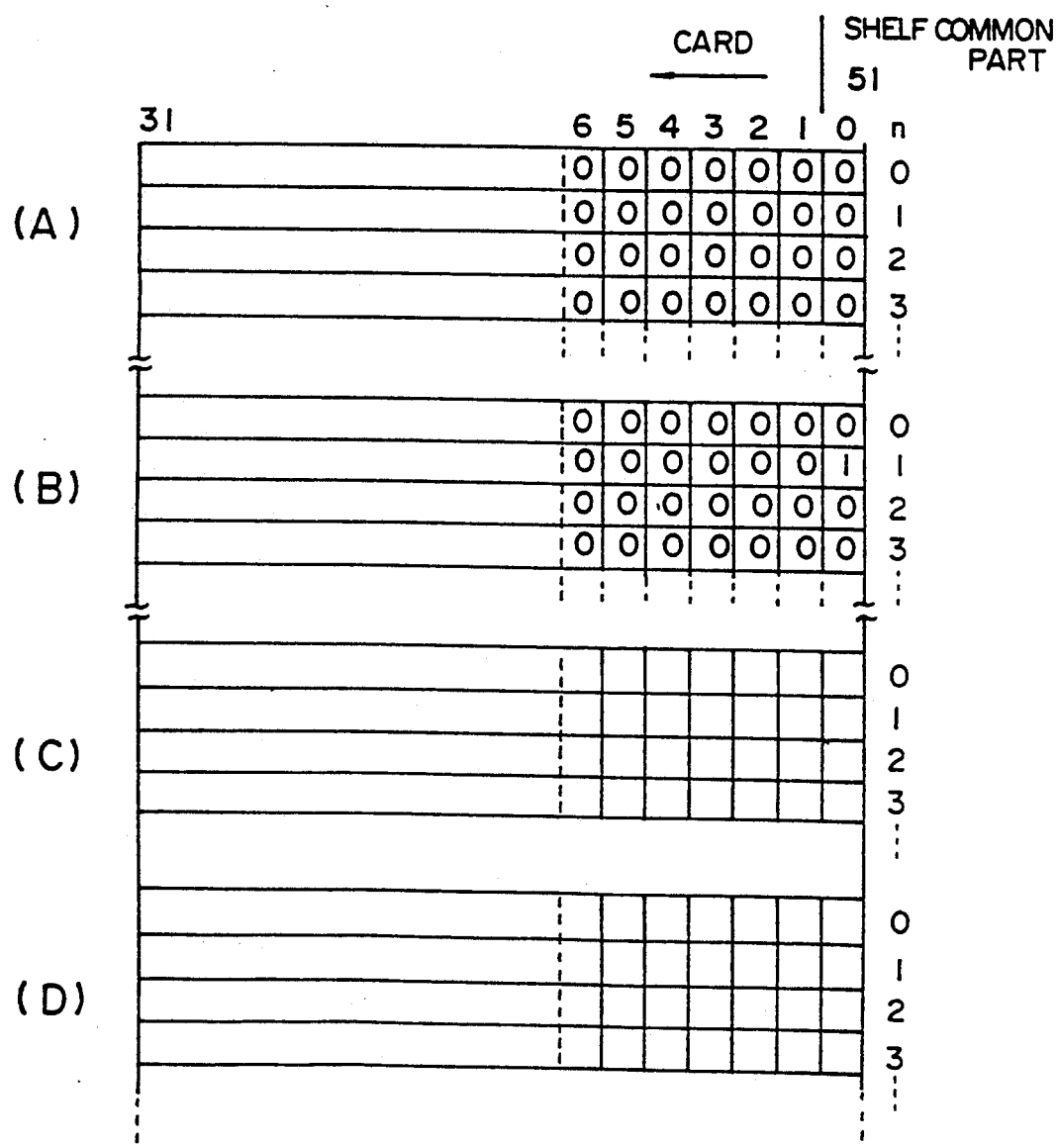
FIG. 19 is a diagram illustrating an area which a part of an internal memory used for detecting a request for connection change.

As described previously, the contents of the internal register of a unit for which a change of connection is requested have the multiframe format shown in FIG. 4 and are periodically written into the internal register of the processor via the SCN memory (scanner/memory 342 in FIG. 3, for example). When the request to change connection is generated, a corresponding change request bit (FIG. 19B) is set to "1". The processor scans the internal memory at predetermined intervals, and determines whether the change request bit is generated (step 101 shown in FIG. 13A). At the same time, the processor determines whether the connection has actually been changed (step 01). When the processor detects the connection change request (step 102), the access to an area (B) shown in FIG. 19 is inhibited so that a further connection change request is not accepted (step 103). After that, the processor notifies the OM processor 30 of the unit which generates the connection change request (step 104). Then the processor waits for an acknowledgement from the OM processor 30 (step 105).

When the OM processor 30 which is in an idle state (step 201 shown in FIG. 14) receives the notice from the processor generated at step 104, the control proceeds to step 202 at which the OM processor 30 receives the connection change request. Then the OM processor 30 sends acknowledgement to the processor (step 203), and waits for the unit which requests the connection change to be disconnected (step 204).

Turning to FIG. 13A, when the processor receives the acknowledgement from the OM processor 30 (step 106), the processor blocks the subject unit which generates the connection change request (step 107). This is directed to preventing office data relating to this unit from being accessed by a request for services which may occur after the unit requests the connection change so that services happen to be stopped due to the occurrence of connection change. Thereafter, the processor sends an acknowledgement to the subject unit (step 108). Then the processor waits for the subject unit to be disconnected (step 109). If the switch SW of the subject unit is turned OFF so that the request for connection change is canceled (step 110), the processor lets the OM processor 30 know cancellation of the connection change request (step 111). Then the control returns to step 101.

When detecting that the subject unit is disconnected from the system (step 112), the processor notifies the OM processor 30 of this disconnection (step 113). Then the processor waits for a notice indicative of completion of disconnecting the subject unit (step 114). When the connection change request is canceled in the state of step 109, the processor operates as in the case of steps 110 and 111 (steps 115 and 116).

Referring to FIG. 14, the OM processor 30 receives the notice generated at step 113 (step 205), and waits for the subject unit to be connected (step 206). If the OM processor 30 is notified that the subject unit cancels the connection change request (step 207), the control returns to the idle state at step 201.

After that, when the processor is informed that the connection change is completed and the subject unit is connected to the same position (step 119 shown in FIG. 13B), the processor lets the OM processor 30 know that the connection change request is canceled (step 120). Then the control returns to step 101. On the other hand, when the processor is informed that the subject unit is connected to a different position (step 121), the processor executes a process of step 131 shown in FIG. 13C, and waits for a notice of connection completion from the OM processor 30. In this case, since the connection is changed under the control of the same processor, two separate processes are simultaneously running. At step 121, the processor notifies the OM processor 30 that the subject unit is connected. Then the processor waits for data after editing supplied from the OM processor 30 (step 132) and waits for notice of completion (step 114).

When the OM processor 30 is informed of the notice of step 131 (step 208), it edits office data resulting from the change of connection of the subject unit (step 209). Then the OM processor 30 transfers edited office data to a processor to which the subject unit is newly connected (step 210). Then the OM processor waits for a notice of completion of data editing from the processor (step 211). When the OM processor receives the cancellation of the connection change request generated at step 206 (step 212), the control returns to step 201.

Turning to FIG. 13C, the processor receives the data transferred from the OM processor 30 (step 133), and then performs data editing (step 134). When the data editing is completed, the processor notifies the subject unit of the completion of data editing (step 135). Then the processor waits for the change confirmation from the subject unit (step 136). The craft person turns OFF the switch SW of the subject unit so that the change acknowledgement/confirmation bit 264 is set to "0". Thereby the processor is informed of the completion of connection (step 137). Then, the processor sends a confirmation to the OM processor 30 (step 138). Then the control returns to step 101. The OM processor 30 receives the confirmation indicative of the completion of connection from the processor associated with the subject unit (step 212 shown in FIG. 14), and sends the notice of the completion of connection to the processor which is previously associated with the subject unit before changing connection (step 213). This processor receives the notice of the OM processor 30 (step 117 shown in FIG. 13B), and cancels data relating to the subject unit stored in the internal memory thereof (step 118). Then the control returns to step 101.

Figure 15:
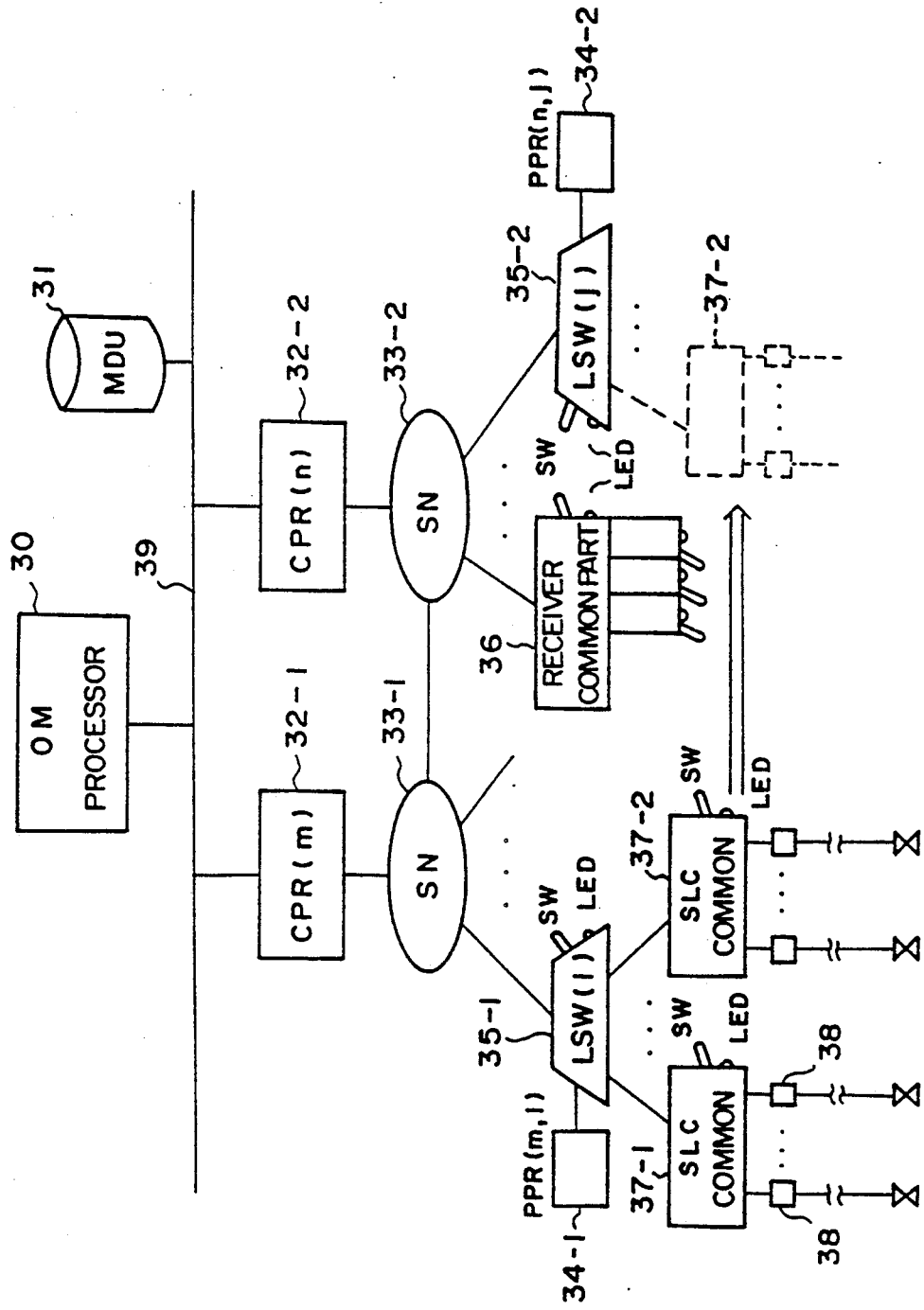
FIG. 15 is a diagram of an example of connection change.

Next, a description is given of an actual processing in accordance with the above-mentioned processing. The following description relates to a case where as shown in FIG. 15 the subscriber line circuit common part (SLC) 37-2 (FIG.5) connected to the line concentration switch 35-1 is detached therefrom, and is then connected to the line concentration switch 35-2. A sequence for this case is illustrated in FIG. 16. FIG. 17 shows changes in data in the internal memories of the peripheral processor 34-1 (hereafter referred to as PPR(m, i), the call processor 32-1 (hereafter referred to as CPR(m)), the OM processor 30, the call processor 32-2 (hereafter referred to as CPR(n)) and the peripheral processor 34-2 (hereafter referred to as PPR(n, j)).

Referring to FIG. 16, the switch SW of the subscriber line circuit common part 37-2 is turned ON (P1). Thereby the connection change request bit in the status supervising data SCN is set to "1", which is recorded in a supervisory information memory (described later) provided in the peripheral processor PPR(m, i) (P2). The peripheral processor PPR(m, i) detects the request and notifies the call processor CPR(m) of this request (P3). Further, the call processor CPR(m) informs the OM processor of the request generated by the subscriber line circuit common part 37-2 (P3). An acknowledgement signal is supplied to the CPR(m) and PPR(m, i) in this order from the ORM processor 30 so that data relating to the subject unit (subscriber line circuit common part 37-2) stored in the internal memory of each of the CPR(m) and PPR(m, i) are inhibited from being accessed (blocked) (P4). The change acknowledgement bit in the control information memory of the peripheral processor PPR(m, i) is set to "1", which is transferred to the subject unit (P5). Then the light-emitting diode LED indicative of the acknowledgement of the request turns ON (P6). Then the subject unit is detached from the associated shelf (P7). The peripheral processor PPR(m, i) detects that the subject unit is detached,,from the shelf. This is transferred from the PPR(m, i)to the CPR(m) and OM processor 30 in this order (P8). The subject unit (subscriber line circuit common part 37-2) is connected to the line concentration switch LSW(j) 35-2 (P9). The peripheral processor PPR(n, j) detects that the subject unit has been connected to the line concentration switch LSW(j), and informs the PPR(n, j), CPR(n) and the OM processor 30 of the detection result in this order (P10). The OM processor 30 discriminates a new connection position and reads out office data to be transferred from the magnetic disk unit 31 (P11). Then the OM processor 30 starts to edit and renew the office data stored in the internal memory thereof as well as the magnetic disk unit 31 (P12). The OM processor 30 discriminates the new connection position and immediately transfers data relating to the subject unit (P13). The call processor CPR(n) transfers only necessary data to the peripheral processor PPR(n, j) (P13). The control data relating to the peripheral processor PPR(n ,j) is written into the internal memory thereof so that the change acknowledgement/confirmation bit 264 is set to "1" and then transferred to the subject unit (subscriber line circuit common part 37-2) (P14). Then the light-emitting diode LED indicative of the completion of data transfer turns ON (P15). The craft person turns OFF the switch SW to send the completion of connection. The change request bit 263 becomes "0" (the change request bit in the status supervisory data SCN is in the OFF state), and the completion of connection is transferred to the PPR(n ,j), CPR(n), OM processor 30, CPR(m) and the PPR(m, j) in this order (P18). The value of the control information bit in the peripheral processor PPR(n, j) is altered and the change acknowledgement bit is set "0", which is transferred to the subject unit (P19). The light-emitting diode of the subject unit turns OFF so that the craft person completes the operation of the connection change (P20).

As shown in FIG. 17 which shows changes in the contents of the internal memories of the elements, data is deleted which relates to the subject unit which is stored, before changing connection, in the internal memory of each of the peripheral processor PPR(m, i) and the call processor CPR(m), and data in the internal memory of the OM processor 30 and the magnetic disk unit 31 are revised by the editing and renewing process. The call processor CPR(n) which is the connection destination of the subject unit is provided with data relating to the subject unit from the magnetic disk unit 31 for the backup use through the OM processor 30. Then the call processor CPR(n) edits and renews the data and then stores the same in its internal memory. Then some of the data which is received by the call processor CPR(n) is transferred to the internal memory of the peripheral processor PPR(n, j). Then the peripheral processor PPR9n, j) edits and renews the contents of the internal memory thereof in accordance with the received some of the data.

Figure 18A:
FIGS. 18A and 18B are diagrams illustrating an example of change in office data.
Figure 18B:

As an example, changes in the contents of the internal memories are illustrated in FIGS. 18A and 18B. The illustrated changes relate to a case where the connection of the shelf 0203-2 is changed from a terminal of the peripheral processor PPR(i) having line concentration switch terminal number 1 to a terminal of the peripheral processor PPR(j) having line concentration switch terminal number 2. FIG. 18A illustrates the contents of the card allocation table before and after changing connection to the shelf 02023-2.

The contents of the card allocation table are revised in accordance with the change of connection as follows. A table portion related to the shelf 0203-2 of the peripheral processor PPR(i) associated with the call processor CPR(m) is deleted. The peripheral processor PPR(9) associated with the call processor CPR(n) is supplied with a table portion relating to the shelf 0203-2 in order of the OM processor 30, CPR(n) and PPR(j).

The office data relating to the call processors CPR(m) and CPR(n) are revised as follows. In the call processor CPR(m), data relative to the shelf 0203-2 is deleted. The call processor CPR(n) receives data relating to the shelf 0203-2 from the OM processor 30. The office data managed by the OM processor 30 is changed as shown in FIG. 18B. Along with this change, all office data relating to the change of connection are rewritten. Then rewritten data is transferred to the units associated with the connection destination.

Finally, a description is given of a procedure for detecting the connection change request at step 102 shown in FIG. 13A. In order to detect the connection change request, a part of the storage area of the internal memory of each of the peripheral processor PPR and call processor CPR is used for supervising the connection change request as shown in FIG. 19. In the case of the peripheral processor PPR, the area shown in FIG. 19 is formed as follows. One word is composed of 32 bits. Each word corresponds to an individual terminal shelf of the line concentration switch LSW. The position of each word coincides with the terminal number of each terminal of the line concentration switch LSW. The zero-th bits of the words assigned to the individual terminal shelf common parts 51 (FIG. 7), and the subsequent bits are assigned to cards accommodated in the individual terminal shelves.

The change request bit is stored in an area (B) shown in FIG. 19. This area is supplied with ON/OFF information on the switch SW in the maintenance time slot (FIG.4) of the multiplexed signal sent in the multiframe format through the optical fiber cable 53 shown in FIG. 9. The maintenance time slot is extracted from the inserter/dropper 51d (FIG. 9), and then transferred to the internal memory (not shown in FIG. 9) through the multiplexer/demultiplexer 51c. The period of writing ON/OFF information is based on the period of the multiframe.

An area (A) stores the status obtained when the processing of the peripheral processor PPR last accessed the change request bit. The period of writing is equal to the frequency of access. A word stored in the area (A) is specifically referred to as a change request last look word.

An area (D) indicates the state of insertion of cards. The period of writing is based on the period of the multiframe.

An area (C) indicates the state obtained when the processing of the peripheral processor PPR last accessed the connection status bit. The period of writing is equal to the frequency of access.

Figure 20:
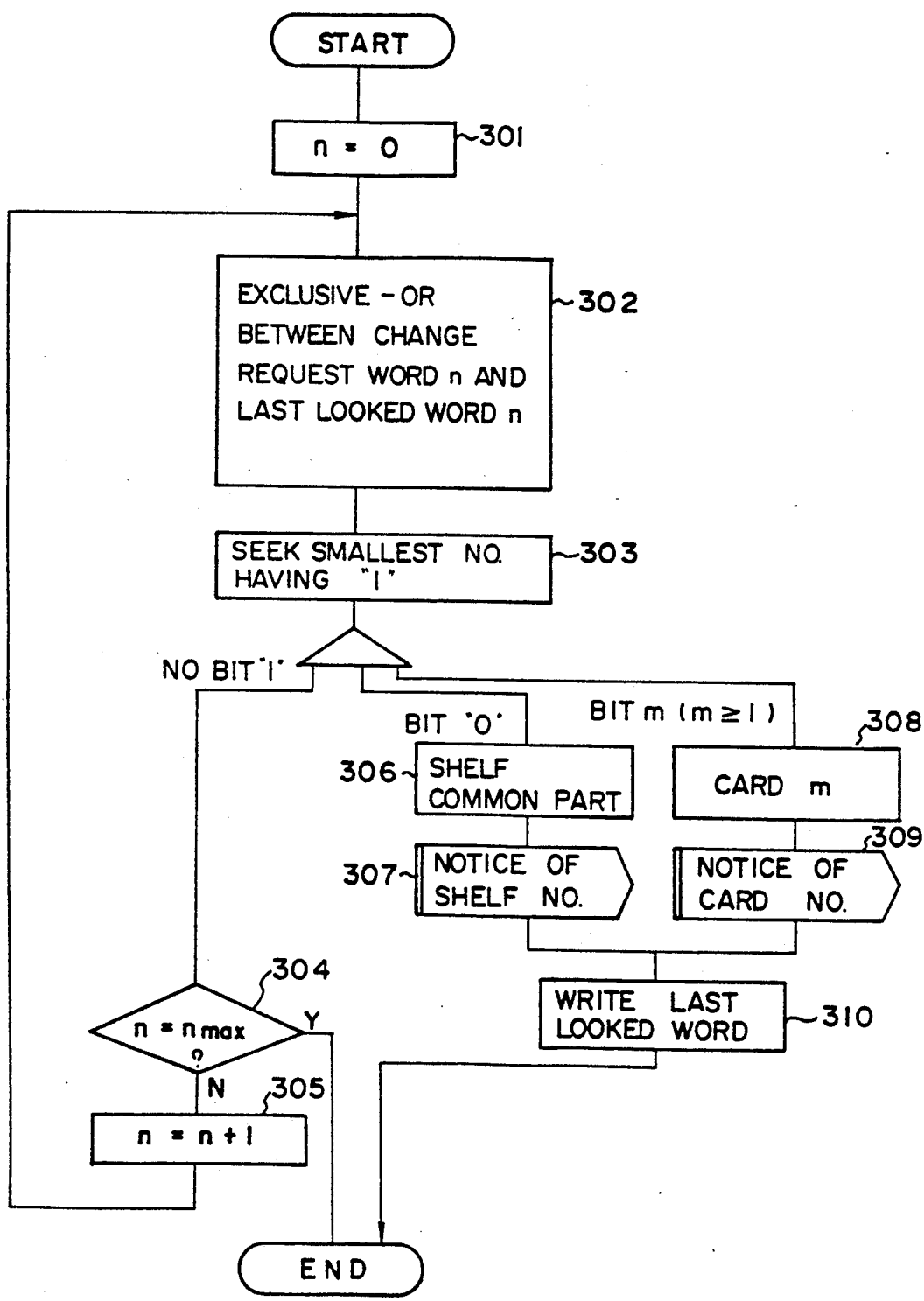
FIG. 20 is a flowchart of a procedure for detecting a request for connection change in a peripheral unit.

FIG. 20 is a flowchart of a procedure for detecting the connection change request in the peripheral processor PPR. A program defining the illustrated procedure is periodically activated by a task scheduler of the peripheral processor. According to the present invention, it is impossible to change connection of more than one unit at one time. Thus, when the request from a unit is accepted, other requests are neglected until the procedure for the accepted request is completed (step 103 shown in FIG. 13A). First, an exclusive-OR, operation between the n-th word (change request last look word) in the area (A) shown in FIG. 19 and the n-th word (change request word) in the area (B) is compared in turn from the zero-th word (steps 301 and 302). During the exclusive-OR operation, a value of "1" is given to each position where a change takes place. Then the peripheral processor seeks one of the words which has a smallest word number and has a value of "1" (step 303). When the operation result does not contain a bit of "1", it is determined whether $n = n_{max}$ where $n_{max}$ is the largest word number (step 304). That is, it is discerned whether all the words have been checked. When the result of step 304 is YES, the peripheral processor terminates the processing. On the other hand, when the result of step 304 is NO, the number of n is incremented by 1 ($n = n+1$) at step 305. Then the procedure returns to step 302.

When it is determined at step 303 that the zero-th bit is "1", the peripheral processor PPR acknowledges that a request to change connection of the shelf common part 51, that is, the shelf including this change request, is generated. Then the peripheral processor PPR lets a high-order processor know the shelf number (step 307). The process of step 307 is done by another program module of the peripheral processor PPR. Then the connection state bit obtained when the area (D) shown in FIG. 19 is last accessed by the peripheral processor PPR is written into the area (C) shown in FIG. 19 (step 310).

When it is determined at step 303 that the m-th bit (m≧1) is "1", the peripheral processor PPR acknowledges that a request to change connection of the card m is generated. Then the peripheral processor PPR notifies a higher-order processor of the number of the card m. Then the peripheral processor executes step 310.

The benefit of industrial application of the present invention are as follows. It is possible to change connection of the subject unit and revise office data relating thereto at the same time. Thus it is possible to reduce the number of steps necessary for changing office data.

Conventionally, the change of connection is greatly dependent on manual operation of the craft person, which causes a large number of errors. According to the present invention, the occurrence of such errors is eliminated.

The craft person completes all operation in a working field where connections of units are actually changed. Thus, it is unnecessary for the craft person to go to a console specially.

The present invention is suitable for configuring a hierarchical exchange system.

I claim:

1. A method of automatically editing data for managing processing units hierarchically provided in a system, said system having a management processor having data for managing said processing units, and high-order processing units of said processing units having data for managing low-order processing units of said processing units, said method comprising the steps of:
    (a) determining, in a first high-order processing unit, whether a request to change a connection of a request source unit of said low-order processing units is generated;
    (b) notifying, from said first high-order processing unit, said management processor when said request source unit generates said request;
    (c) sending an acknowledgement signal from said management processor to said request source unit;
    (d) sending, after receiving said acknowledgement signal, a disconnect signal, obtained by detaching said request source unit from said system, from said request source unit to said management processor through said first high-order processing unit;
    (e) determining, in said management processor, when said request source unit is initially connected to a second high-order processing unit;
    (f) editing, in said management processor, the data for managing said request source unit to generate edited data, transferring said edited data to said second high-order processing unit now connected to said request source unit, and notifying said request source unit that the request to change the connection is completed; and
    (g) deleting the data for managing said request source unit from said first high-order processing unit.

2. A method as claimed in claim 1, wherein said request to change the connection in step (b) is provided by turning ON a switch provided in said request source unit.

3. A method as claimed in claim 1, wherein step (c) further comprises a step of notifying an operator, through an indicator provided for said request source unit, that said acknowledgement signal is received.

4. A method as claimed in claim 1, wherein the step (a) is carried out periodically.

5. A method as claimed in claim 1, wherein the step (c) further comprises a step of blocking the data for managing said request source unit stored in said processing units located between said request source unit and said management unit.

6. A method as claimed in claim 1, wherein the step (e) is carried out periodically.

7. A method as claimed in claim 1, wherein the step (f) further comprises a step of notifying an operator, through an indicator provided for said request source unit, that the acknowledgement signal is step (c) is received.

8. A method as claimed in claim 1, further comprising the steps of
    (h) determining whether said request source unit has cancelled said request to change the connection, and
    (i) returning to step (a) immediately when said request source unit cancels said request.

9. A method as claimed in claim 1, wherein said processing units comprise processors for performing distributed processing.

10. A method as claimed in claim 1, wherein each of said processing units comprises a processor for performing distributed processing in said system and control units connected to said processor.

11. A system of a hierarchical structure, said system comprising:
    processing units connected in a hierarchical structure with at least one processing unit at a highest level, said processing units including low-order and high-order processing units;
    management processor connected to said at least one processing unit located at the highest layer level, said management processor managing said processing units and storing data used for managing said processing units,
    each of said low-order processing units including
        first means for generating a request to change a connection in said system,
        second means for providing an operator with an indication based on one of an acknowledgement signal and a confirmation signal of said request derived from said management processor, and
        third means for generating a first signal when each of said low-order processing units is detached from said system and for generating a second signal when each of said low-order processing units is connected to said system again,
    each of said high-order processing units including
        fourth means for determining whether one of said low-order processing units has generated said request and informing said management processor of said request, and
        fifth means for storing said data used for managing the one of said low-order processing units,
    said management processor including
        sixth means for supplying said acknowledgement signal to the one of said low-order processing units which has generated said request when said management processor is informed of said request, seventh means for editing said data for the one of said low-order processing units which has generated said request when said management processor receives said first signal derived from said third means, and eight means for sending said edited data together with said acknowledgement signal to ones of said high-order processing units to be connected to said one of the low-order processing units which has been detached from and then connected to said system when said management processor receives said second signal derived form said third means, said data stored in said fifth means being revised based on said edited data supplied from said management processor.

12. A system as claimed in claim 11, wherein said first means includes a switch, and said first means generates said request to change the connection by turning ON said switch.

13. A system as claimed in claim 11, wherein said first means includes a switch, and said first means generates said request to change the connection by turning ON said switch, and said first means includes a register which stores bit data indicating an ON/OFF state of said switch.

14. A system as claimed in claim 11, wherein said second means comprises indication means for emitting light when said acknowledgement signal and when said confirmation signal is received.

15. A system as claimed in claim 11, wherein said second means comprises a register which stores bit data indicating whether one of said acknowledgement signal and said confirmation signal is received, and indication means for emitting light when said acknowledgement signal and when said confirmation signal is received.

16. A system as claimed in claim 11, wherein said third means comprises a power supply loop through each low-order processing unit from said high-order processing unit connected thereto which generates said first signal when said low-order processing unit is detached from said system, thereby breaking said power supply loop and generates said second signal when said low-order processing unit is connected to the system, thereby completing said power supply loop.

17. A system as claimed in claim 11,
wherein said third means comprises a power supply loop through each low-order processing unit from said high-order processing unit connected thereto which generates said first signal when said low-order processing unit is detached from said system, thereby breaking said power supply loop and generates said second signal when said low-order processing unit is connected to the system, thereby completing said power supply loop, and
wherein said third means further comprises a register which stores a first bit data when said first signal is generated and stores a second bit data when said second signal is generated.

18. A system as claimed in claim 11, wherein said fourth means determines whether one of said low-order processing units generates said request in said first means by scanning said low-order processing units periodically.

19. A system as claimed in claim 13, wherein said fourth means periodically scans said register provided in each of said low-order processing units.

20. A system as claimed in claim 11, wherein each of said processing units comprises a first processing unit, and said first processing unit includes a processor, and elements directly controlled by said processor.

21. A system as claimed in claim 11, wherein each of said processing units comprises means for multiplexing request for changing connections from said low-order processing units and said first and second signals generated by said third means to thereby generate multiplexed data nd for sending said multiplexed data in a multiframe format to corresponding ones of said high-order processing units.

22. A system as claimed in claim 21, wherein said multiplexed data is sent in a predetermined time slot of said multiframe format.

23. A system as claimed in claim 22, wherein said system comprises a bay, and each of said processing units has a shelf, which is accommodated in said bay.

24. A system as claimed in claim 23, wherein said shelf comprises a plurality of cards, each of which accommodates a corresponding one of said processing units.

25. A system as claimed in claim 23, wherein said shelf comprises a front panel to which said first means and said second means are fastened.

26. A system as claimed in claim 24, wherein each of said cards comprises a front panel to which said first means and said second means are fastened.

27. A system as claimed in claim 11, wherein an indication, provided to the operator when said second means of the one of said low-order processing units which generates said request to change the connection receives said acknowledgement signal, represents that said management processor indicates that said one of the low-order processing units is to be detached from said system.

28. A system as claimed in claim 11, wherein an indication, provided to the operator when said second means of the one of said low-order processing units which generates said request to change the connection receives said confirmation signal, represents that the change of the connection is completed.

29. A system as claimed in claim 11, wherein each of said low-order processing units comprises subscriber line circuits which accommodate a plurality of subscribers, and wherein each of said high-order processing units comprises a line concentration switch which accommodates some of said subscriber line circuits and a processor controlling said line concentration switch.

30. A system as claimed in claim 11, wherein said low-order processing units comprise line concentration switches which accommodate a plurality of subscriber lien circuits, and a processor controlling said lien concentration switch, and wherein each of said processing units serving as said high-order processing units comprises a switch network which accommodates some of said line concentration switches and a processor controlling said switch network.

31. A system as claimed in claim 11, wherein each of said low-order processing units comprises trunks and trunk control means for controlling said trunks, and each of said high-order processing units comprises a switch network which accommodates some of said trunk control means and a processor which controls said switch network.

32. A system as claimed in claim 11, wherein said system comprises telephone sets, and each of said low-order processing units comprises receiving means for receiving tone signals supplied from said telephone sets, and wherein each of said high-order processing units comprises control means for controlling said receiving means.

33. A system as claimed in claim 11, wherein said system is an exchange system.

* * * * *

UNITED STATES PATENT AND TRADEMARK OFFICE
CERTIFICATE OF CORRECTION

PATENT NO. : 5,299,316
DATED : March 29, 1994
INVENTOR(S) : Suzuki

It is certified that error appears in the above-indentified patent and that said Letters Patent is hereby corrected as shown below:

Title page, Item [57] Abstract, line 8, "(20." should be —(20).—;
line 10, "to," should be —to—;
line 11, after "data" insert —is transferred—.

Col. 1, line 6, center and insert —BACKGROUND OF THE INVENTION—;

between lines 16 and 17, center and insert —DESCRIPTION OF THE RELATED ART—;

line 18, delete "a" (first occurrence);

line 37, delete "DESCRIPTION OF THE RELATED ART";

line 65, "with" should be —using—.

Col. 2, line 27, delete "a";

line 34, delete "which is";

line 53, "15," should be —15—.

Col. 3, line 13, "data" should be —the data—; delete "much";

line 18, "connection" should be —connections—;

between lines 21 and 22, center and insert —SUMMARY OF THE INVENTION—;

line 35, delete "SUMMARY OF THE INVENTION";

line 45, delete "unit" (second occurrence);

line 56, after "determines" insert —whether—;

UNITED STATES PATENT AND TRADEMARK OFFICE
CERTIFICATE OF CORRECTION

PATENT NO. : 5,299,316
DATED : March 29, 1994
INVENTOR(S) : Suzuki

It is certified that error appears in the above-indentified patent and that said Letters Patent is hereby corrected as shown below:

Col 3, line 58, "units. "Finally, data is" should be --units,--;

line 59, delete "deleted,";

line 67, NO NEW PARAGRAPH; "Step (g) deletes data" should be --Finally, data is deleted,--;

line 68, after "source," insert --from--.

Col. 4, line 4, after "is" insert --arranged--; "follow" should be --follows.--;

line 5, after "system" insert --has--;

line 10, "units s" should be --units serve--;

line 17, after "processor," insert --and--;

line 43, after "management" insert --stored--; "units" should be --unit--.

Col. 5, line 11, delete "a";

line 13, delete "a" (second occurrence);

line 62, "(card)," should be --(as a card),--.

Col. 6, line 7, "change" should be --a changed--.

Col. 7, line 22, "by the periodical" should be --based on a periodic--.

Col. 8, line 55, after "as" insert --a--.

UNITED STATES PATENT AND TRADEMARK OFFICE
CERTIFICATE OF CORRECTION

PATENT NO. : 5,299,316
DATED : March 29, 1994
INVENTOR(S) : Suzuki

It is certified that error appears in the above-indentified patent and that said Letters Patent is hereby corrected as shown below:

Col. 9,    line 26, delete "5";

line 54, "tone receiver" should be --the tone receivers--.

Col. 10,   line 32, "card" should be --cards--;

line 36, after "cards" insert --52 are not used as connection changeable elements, and--.

Col. 11,   line 42, delete "connector".

Col. 12,   line 33, "to" should be --for--;

line 49, "01)" should be --101)--.

Col. 13,   line 6, after "of" insert --the--;

line 37, "a" should be --the--.

Col. 14,   line 37, "ORM" should be --OM--;

line 48, "detached,," should be --detached--.

Col. 15,   line 35, "PPR9n,j)" should be --PRN(n,j)--;

line 37, delete "some of the".

Col. 16,   line 2, delete "of the";

line 48, "OR,.operation" should be --OR operation--.

UNITED STATES PATENT AND TRADEMARK OFFICE
CERTIFICATE OF CORRECTION

PATENT NO. : 5,299,316
DATED : March 29, 1994
INVENTOR(S) : Suzuki

It is certified that error appears in the above-indentified patent and that said Letters Patent is hereby corrected as shown below:

Col. 17, line 26, "a working" should be --the--;
        line 29, "console specially." should be --special console.--.

Col. 18, line 9, delete "the";
        line 41, before "management" insert -----a--.

Col. 20, line 8, "data nd" should be --data and--;
        line 48, "lien" (both occurrences) should be --line--.

Signed and Sealed this

Thirteenth Day of September, 1994

Attest:

BRUCE LEHMAN

Attesting Officer    Commissioner of Patents and Trademarks